US010004361B2

(12) United States Patent
Beebe et al.

(10) Patent No.: US 10,004,361 B2
(45) Date of Patent: *Jun. 26, 2018

(54) DEVICE FOR SECURING ELONGATE ARTICLE

(71) Applicant: Evriholder Products, LLC, Anaheim, CA (US)

(72) Inventors: Joel Beebe, Columbus, OH (US); Nicholas Vallo, New Albany, OH (US); Christopher Brown, Columbus, OH (US); Matthew Siebert, Columbus, OH (US); Bret Gould, Worthington, OH (US); Christopher Hawker, Columbus, OH (US); Abraham Alexander, Columbus, OH (US)

(73) Assignee: Evriholder Products, LLC, Anaheim, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/641,761

(22) Filed: Mar. 9, 2015

(65) Prior Publication Data

US 2016/0331187 A1 Nov. 17, 2016

Related U.S. Application Data

(60) Provisional application No. 61/949,888, filed on Mar. 7, 2014.

(51) Int. Cl.
*A47J 47/16* (2006.01)
*F16M 13/02* (2006.01)
*F16B 2/22* (2006.01)

(52) U.S. Cl.
CPC .............. *A47J 47/16* (2013.01); *F16B 2/22* (2013.01); *F16M 13/022* (2013.01); *F16M 2200/00* (2013.01)

(58) Field of Classification Search
CPC .. A47J 47/16; A47J 47/00; F16B 2/22; F16M 13/022; F16M 2200/00
USPC ............. 248/223.41, 303, 110, 111, 113; 211/70.6, 94.01, 106.01, 70.8, 63, 66–68, 211/124, 61.1
See application file for complete search history.

(56) References Cited

U.S. PATENT DOCUMENTS

| 98,756 A * | 1/1870 | Franklin et al. ...... A47L 13/512 |
| | | 24/115 R |
| 243,898 A * | 7/1881 | Hill ....................... A47L 13/512 |
| | | 211/66 |

(Continued)

*Primary Examiner* — Nkeisha Smith
(74) *Attorney, Agent, or Firm* — Louis C. Paul

(57) ABSTRACT

A device for securing an elongate article comprising four finned holder elements, each finned holder element being fabricated of an elastomeric material, the four finned holder elements being oriented in two pairs, a top pair and a bottom pair, each pair having a left and right finned holder element which are mirror images of each other. The element are upwardly disposed relative to the horizontal, and have a side portion contiguous with an upper portion, a base portion, and a back portion and a free edge having a receiving portion and a linear securing portion having a recess. A housing member having left and right cavities holds the left and right finned holder elements in opposing juxtaposition and has a rear portion with a vertical support that separates a left through-hole and a right through-hole.

19 Claims, 31 Drawing Sheets

(56) References Cited

U.S. PATENT DOCUMENTS

| | | | | |
|---|---|---|---|---|
| 369,318 A * | 9/1887 | Craine | A47L 13/512 | 24/115 R |
| 649,115 A * | 5/1900 | Stevens | A47K 1/09 | 211/65 |
| 1,306,585 A * | 6/1919 | Droege et al. | A47L 13/512 | 211/65 |
| 1,366,324 A * | 1/1921 | Newquist | A47G 25/12 | 248/113 |
| 1,958,772 A * | 5/1934 | Stewart | A47G 1/21 | 211/65 |
| 3,063,569 A * | 11/1962 | Huber | A47L 13/512 | 211/89.01 |
| 3,096,960 A * | 7/1963 | Kinney | A47L 13/512 | 248/113 |
| 3,178,141 A * | 4/1965 | Bloom | A47L 13/512 | 211/66 |
| 5,601,196 A * | 2/1997 | Heer | A47L 13/512 | 211/65 |
| 6,412,735 B1 * | 7/2002 | Mathieu | A47K 1/09 | 211/66 |
| 6,595,376 B1 * | 7/2003 | Lin | A47L 13/512 | 211/66 |
| 7,503,459 B2 * | 3/2009 | Grayson | A47B 81/005 | 211/70.8 |
| 7,757,867 B2 * | 7/2010 | Hsieh | A47F 7/0028 | 211/70.6 |
| 7,950,534 B2 * | 5/2011 | Kao | A47F 5/0846 | 211/70.6 |
| 7,959,016 B2 * | 6/2011 | Kao | A47F 5/0807 | 211/70.6 |
| 8,286,807 B2 * | 10/2012 | Winnard | B25H 3/003 | 211/70.6 |
| 8,302,786 B2 * | 11/2012 | Kao | A47F 5/0846 | 211/70.6 |
| D731,206 S * | 6/2015 | Beebe | D6/553 | |
| D731,810 S * | 6/2015 | Beebe | D6/553 | |
| D731,812 S * | 6/2015 | Beebe | D6/553 | |
| 2006/0208138 A1 * | 9/2006 | Huang | A46B 15/0095 | 248/110 |
| 2006/0243686 A1 * | 11/2006 | Grayson | A47B 81/005 | 211/70.6 |
| 2011/0114580 A1 * | 5/2011 | Chen | B25H 3/04 | 211/70.6 |
| 2014/0252820 A1 * | 9/2014 | Botello | F16M 13/02 | 297/188.04 |

* cited by examiner

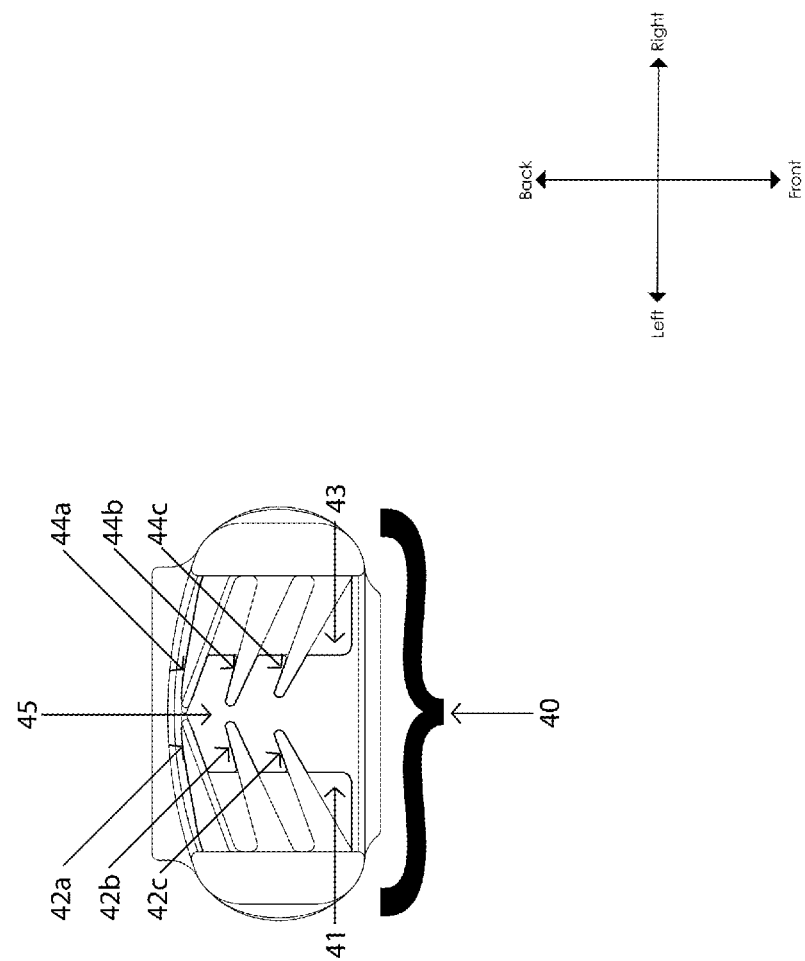

DEVICE FOR SECURING ELONGATE ARTICLE

FIELD OF INVENTION

The present invention is directed to a device for securing an elongate article, preferably a kitchen implement or a household tool.

BRIEF DESCRIPTION OF THE DRAWINGS

FIGS. 9 and 9a illustrate embodiments of the device of the present invention in which the rear portion of the housing member has a vertical support separating a left and right through-holes.

FIG. 16b shows an exploded view of the embodiment in FIG. 16a.

FIG. 17b shows an exploded view of FIG. 17a.

DETAILED DESCRIPTION OF INVENTION

As used in the present application, the term "securing" means to "hold in place".

In preferred embodiments of the present invention, the elongate article is a kitchen implement (non-limiting examples of which include, spoons, knives, forks, spatulas, peelers, mashers, scoops, scrapers, cutters, slicers, shears/scissors, tongs, whisks, can or bottle openers, brushes, meat tenderizers, zesters, corers, reamers and presses), a hand-held tool (non-limiting examples of which include hammer, screw driver, pliers), or cleaning implements (non-limiting examples of which include brooms, mops, dustpans, shovels, rakes, and the like).

Figure 1:
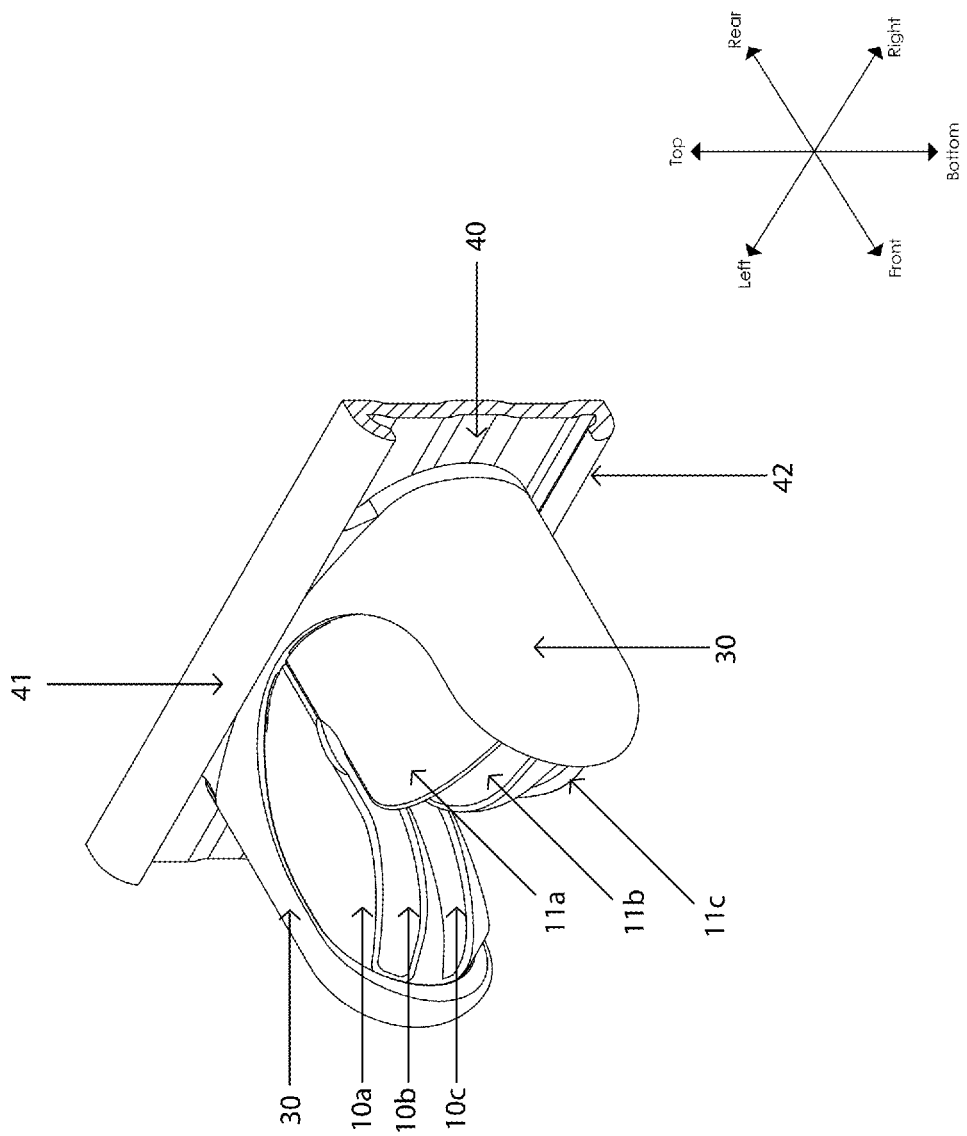
FIG. 1 is a device for securing an elongate article having three pairs of finned holder elements attached to a mounting rail.

FIG. 1 is a device for securing an elongate article having three pairs of finned holder elements—a top-left fin [10a], a middle-left fin [10b], a bottom-left fin [10c], a top-right fin [11a], a middle-right fin [11b], a bottom-right fin [11c] in a housing member [30], affixed to a mounting bracket [40]. (The term "fin" is sometimes used interchangeably with "finned holder element".)

Each pair has a left finned holder element and a right finned holder element; the left and right finned holder elements being mirror images of each other.

Each of the finned holder elements is elastomeric, a term known in the art to mean a material that can exhibit a rapid and reversible strain in response to a stress.

In preferred embodiments, the elastomeric material from which the finned holder elements are fabricated has a Shore Hardness A of from about 35 to about 70.

Shore Hardness is a measure of the indentation resistance of an elastomeric or soft plastic material based on the depth of penetration of a conical indentor and is defined, for example, by ISO Test Standard 868. Shore Hardness values range from 0 (for full penetration) to 100 (for no penetration). Full penetration is between 2.46 and 2.54 mm (0.097 and 0.100 in) depending on the equipment used.

In more preferred embodiments, the Shore Hardness A of the elastomeric material from which the finned holder elements are fabricated is from about 50 to 55.

As used herein in connection with a measured quantity, for example Shore Hardness A or degrees, "about" refers to that variation in the measured quantity as would be expected by one skilled in the art exercising a level of care commensurate with the objective of the measurement and the equipment used, and includes uncertainties that may be introduced by mathematical rounding errors.

In alternate embodiments, the finned holder elements can be fabricated from a soft plastic having a Shore Hardness A of from about 35 to about 70, more preferably a Shore Hardness A of from about 50 to about 55.

In certain preferred embodiments in which the device has mounting rails, the device also has a mounting bracket having a top channel [41] and a bottom channel [42] in slideable engagement with top and bottom mounting rails on the housing member.

Figure 2:
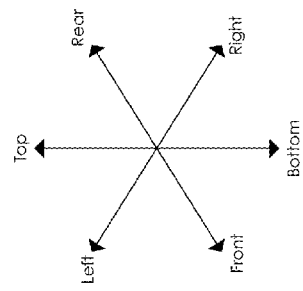
FIG. 2 shows top and bottom mounting on the housing member of the device of the present invention.
Figure 2:
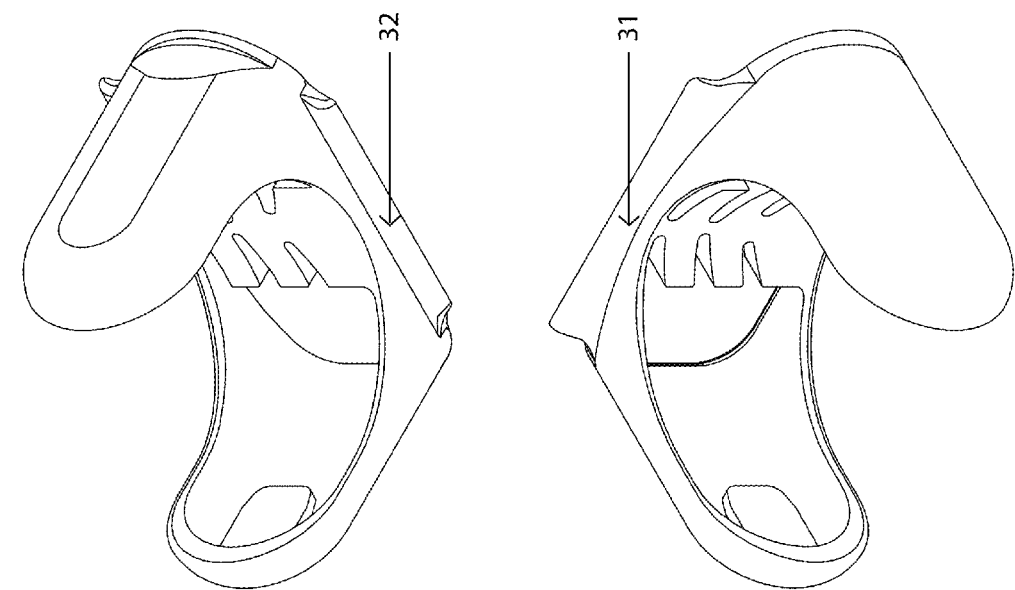

FIG. 2 shows the top and bottom mounting rails [31 and 32] on the housing member. These mounting rails are optional, but are present in certain preferred embodiments of the present invention.

The housing member can, and preferably is, fabricated from plastic. In certain embodiments, the housing member is U-shaped.

Each finned holder element is upwardly disposed at an angle of about 1° to about 60° relative to the horizontal.

In one preferred embodiment, each of the finned holder elements is upwardly disposed at an angle of about 5° to about 45° relative to the horizontal.

In a more preferred embodiment, each of the finned holder elements is upwardly disposed at an angle of about 10° to about 30° relative to the horizontal.

In an even more preferred embodiment, each of the finned holder elements is upwardly disposed at an angle of about 15° to about 25° relative to the horizontal.

Figure 3A:
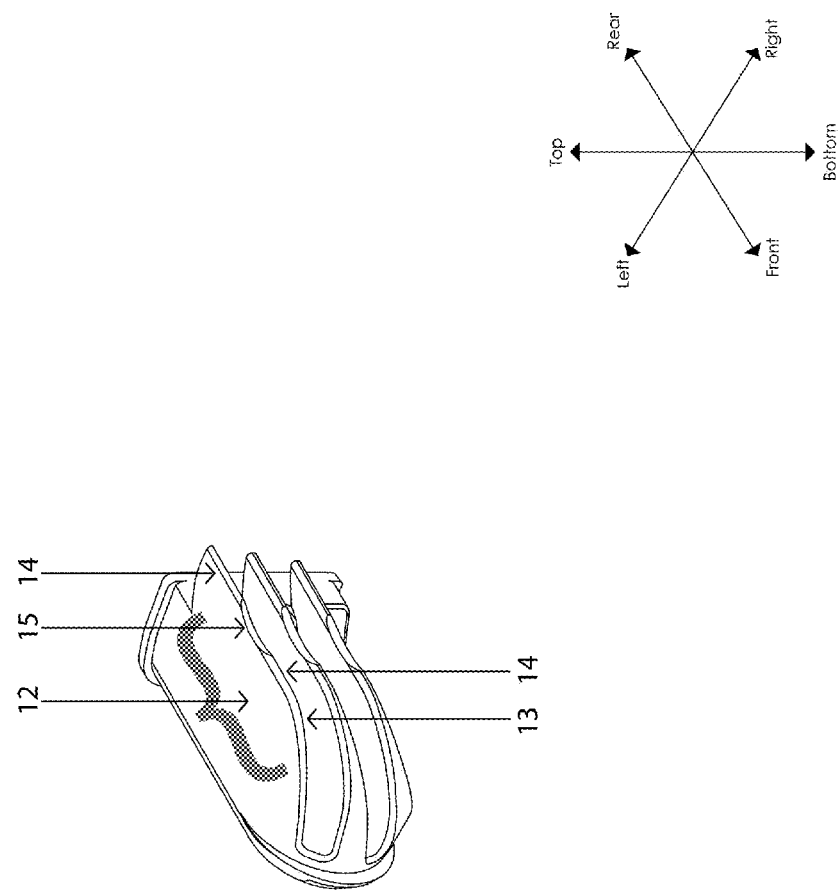
FIGS. 3a and 3b show features of the finned holder elements of the device of the present invention.

FIG. 3a shows features of the finned holder elements with reference to the left fins [10a, 10b and 10c]. The free edge [12] has a receiving portion [13] and a linear securing portion [14] having a recess [15].

Figure 3B:
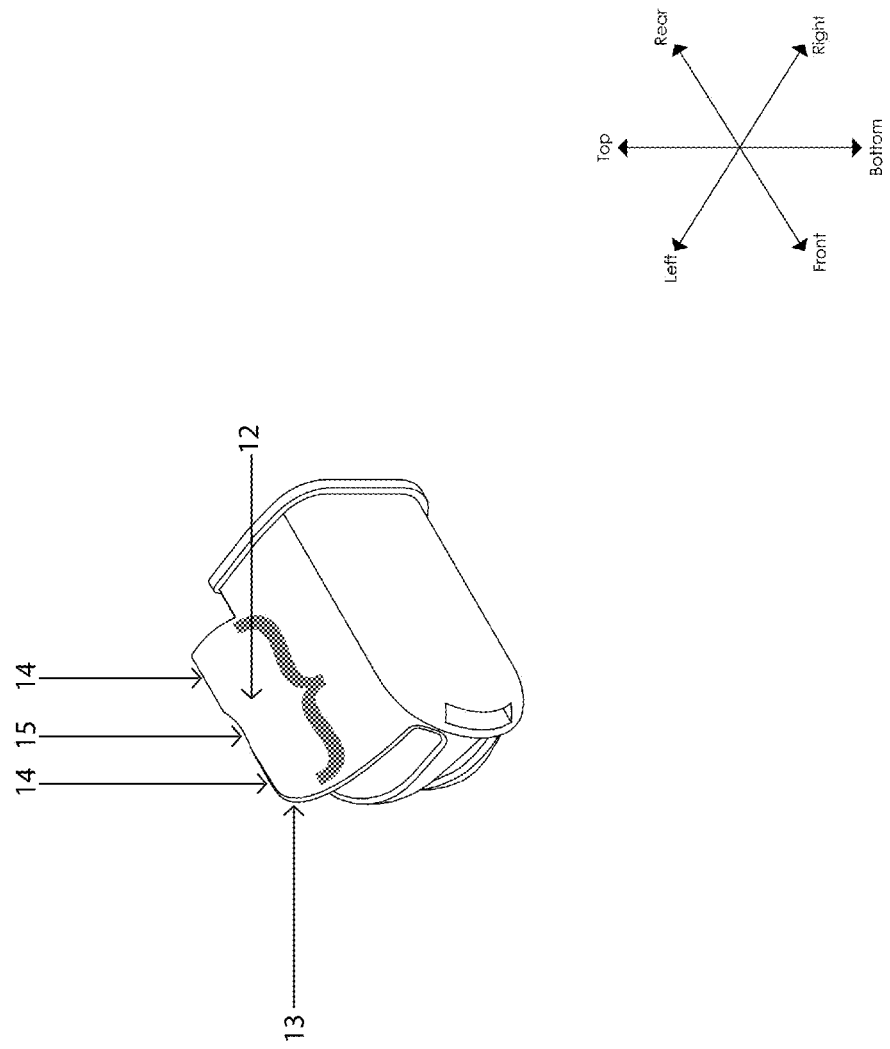

FIG. 3b shows the same features of the finned holder elements with reference to the right fins [11a, 11b and 11c]. The free edge [12] has a receiving portion [13] and a linear securing portion [14] having a recess [15].

In preferred embodiments, the recess [15] is rounded.

Alternatively, the recess can be configured as a notch having two or more straight walls. For example, the notch can be in the shape of a "V".

The straight walls in the notch can, in some embodiments, have one or more convex "nubs" [90], similar to "balls" inserted into a ring, to create a more snug fit.

Figure 4A:
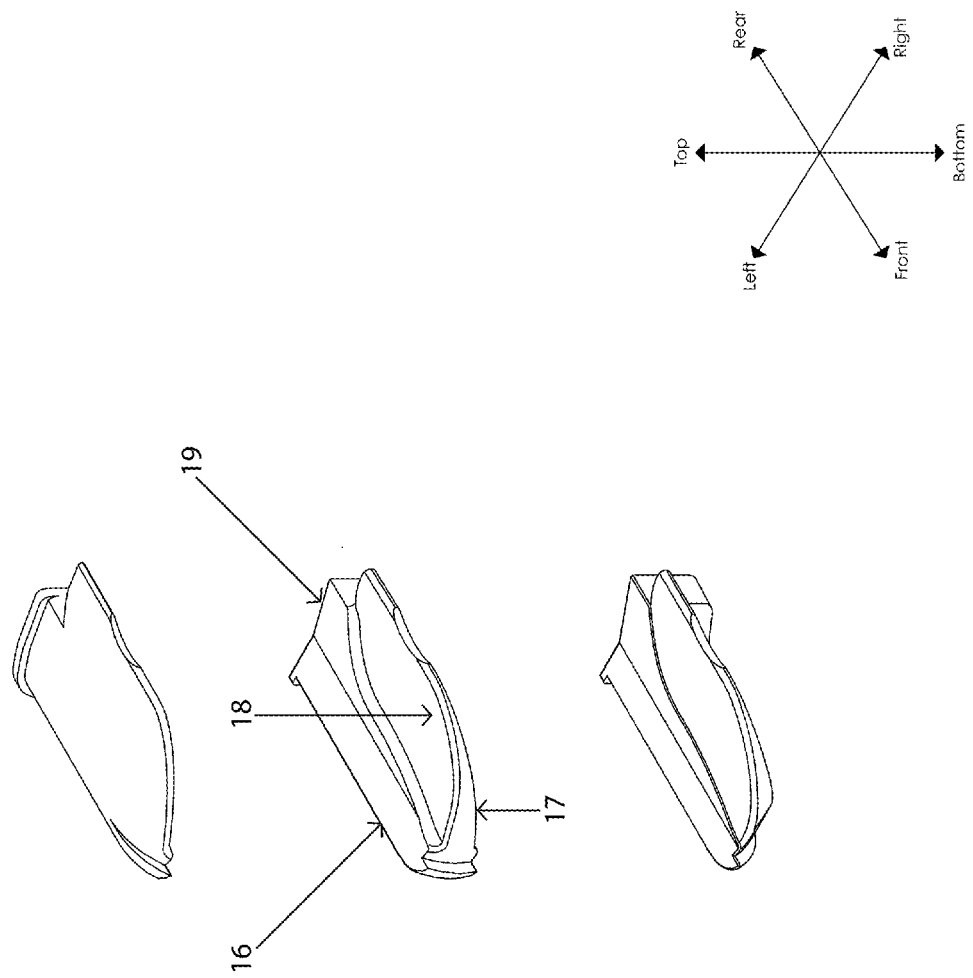
FIGS. 4a and 4b show features of the finned holder elements of the device of the present invention.

FIG. 4a shows features of the finned holder elements with reference to the left fins [10a, 10b and 10c]. Each finned element has a side portion [16] contiguous with an upper portion [18], a base portion [17], and a back portion [19].

Figure 4B:
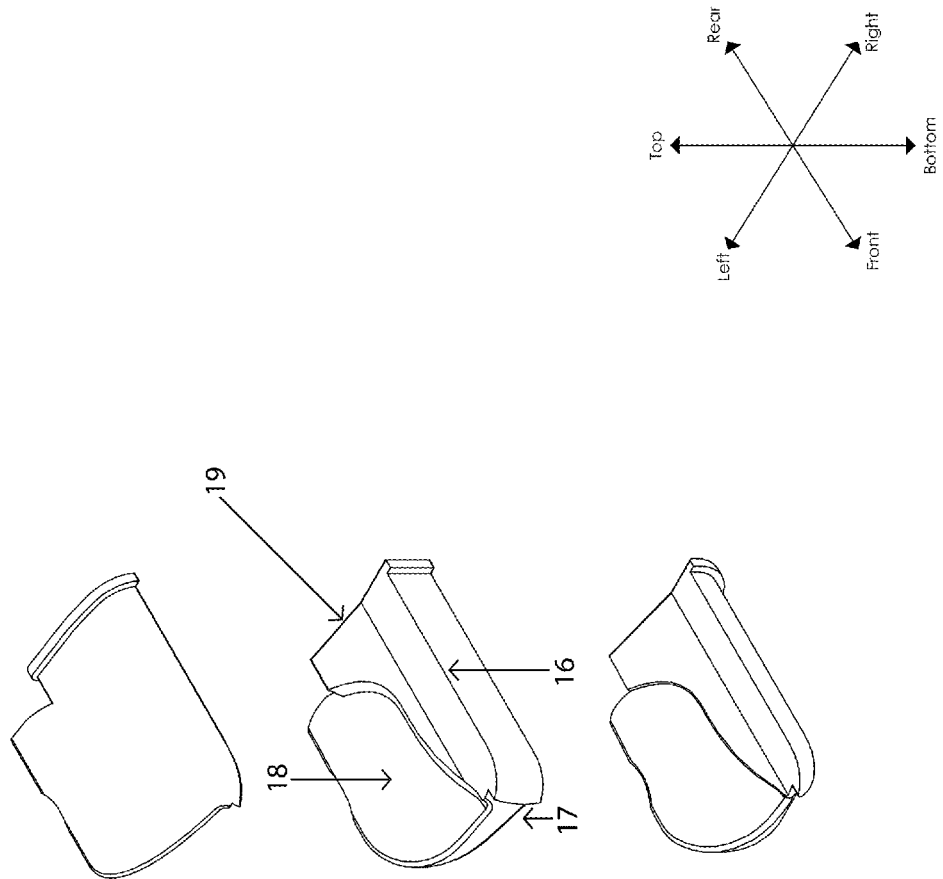

FIG. 4b shows the same features of the finned holder elements with reference to the right fins [11a, 11b and 11c]. Each finned element has a side portion [16] contiguous with an upper portion [18], a base portion [17], and a back portion [19].

Figure 9:
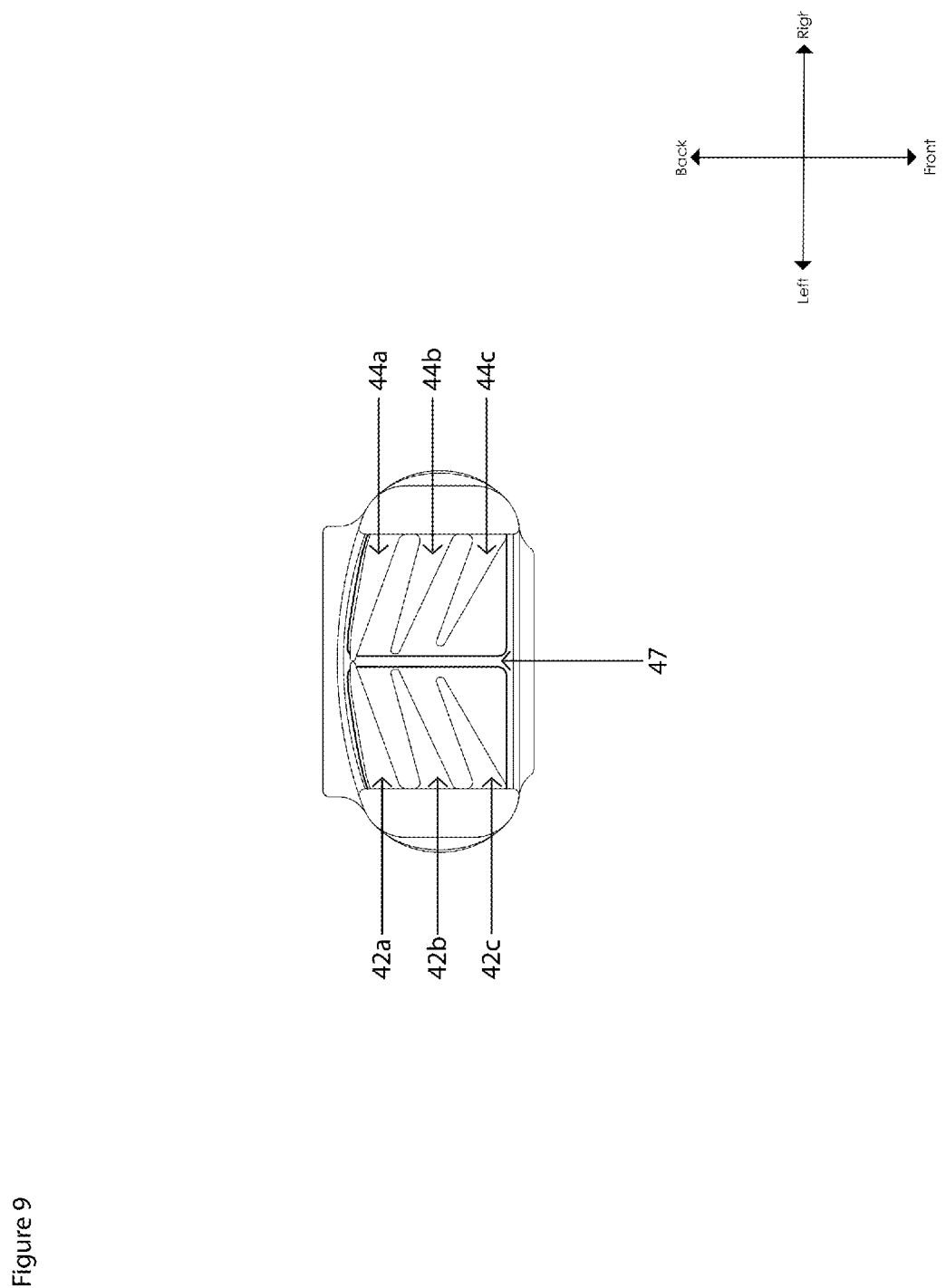

The device of the present invention also comprises a housing member [30] for housing the left and right finned holder elements in opposing juxtaposition. FIG. 9 illustrates the rear portion [40] of the housing member. The rear portion can, and in preferred embodiments, has a vertical support [47] separating a left through-hole [41] and a right through-hole [43].

In embodiments in which the rear portion does not have a vertical support, the finned holder elements are preferably a unitary elastomeric insert.

In preferred embodiments, the vertical support in the rear portion of the housing member is a centrally-located slotted member [45]. FIG. 9a illustrates this preferred embodiment in which the left and right through-holes can be, and in a particularly preferred embodiment are, symmetrically disposed.

The centrally-located slotted member separates the left through-hole and the right through-hole. In FIG. 9a, the left side of the centrally-located slotted member has three slots, a top-left slot [42a], a middle-left slot [42b] and a bottom-left slot [42c]. The right side of the centrally-located slotted member also has three slots, a top-right slot [44a], a middle-right slot [44b], and a bottom-right slot [44c].

The top-left and top-right slots are configured and dimensioned to receive the free edges of the finned holder elements of the top pair.

The middle-left and middle-right slots are configured and dimensioned to receive the free edges of the finned holder elements of the middle pair.

The bottom-left and bottom-right slots are configured and dimensioned to receive the free edges of the finned holder elements of the bottom pair.

Figure 6:
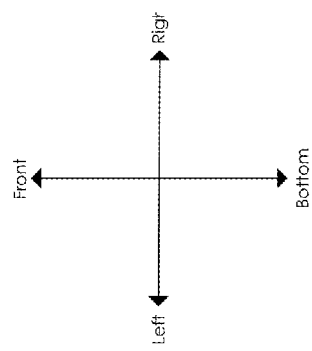
FIG. 6 shows front-facing and bottom-up views of the device of the present invention.
Figure 6:
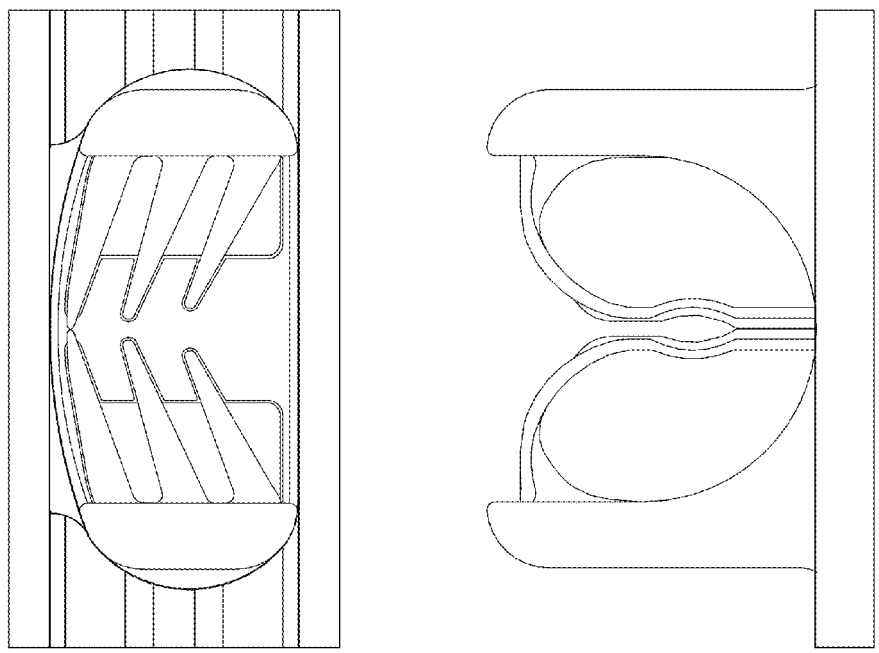

In certain preferred embodiments, the width of the finned holder elements varies such that pairs of finned holder elements are stacked from top to bottom in a manner whereby the width of each fin decreases in the downward direction. FIG. 6 illustrates this preferred embodiment showing front-facing and bottom-up views of the device of the present invention. The width of each of the two finned holder elements in the top pair is greater than the width of the each of the two finned holder elements in the middle pair, and the width of each of the two finned holder elements in the middle pair is greater than the width of each of the two finned holder elements in the bottom pair. The width of each of the finned holder elements is measured from its side portion to the linear securing portion of its free edge.

Similarly, in an embodiment with two pairs of finned holder elements, the width of each of the two finned holder elements in the top pair is greater than the width of each of the two finned holder elements in the bottom pair, where the width of each of the finned holder elements is measured from its side portion to the linear securing portion of its free edge.

Figure 7:
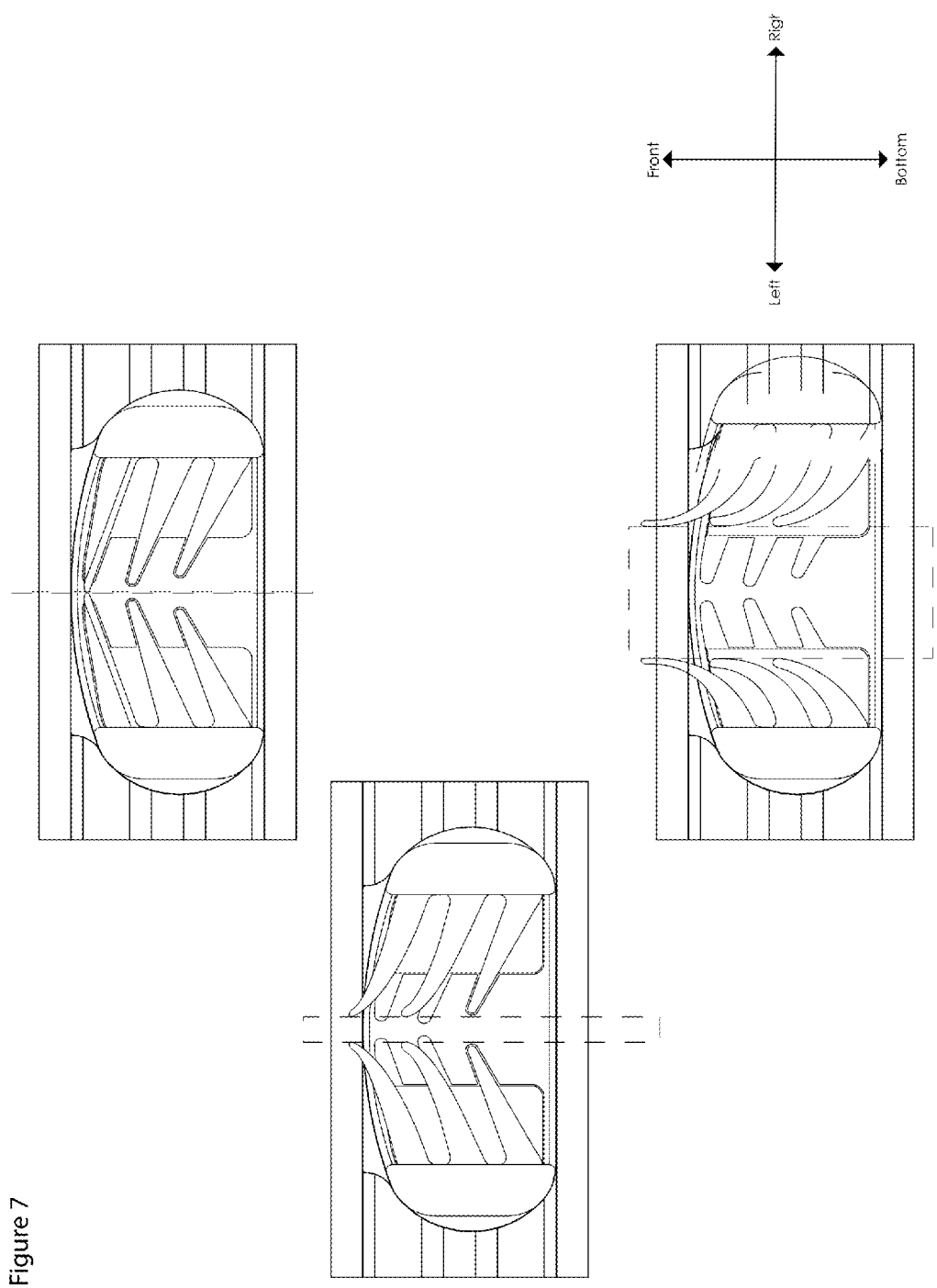
FIG. 7 shows three elongate articles of varying widths and weights held by the device of the present invention.

The use of fins of different width provides a unique advantage to the devices of the present invention—namely, the lower fin(s) are engaged where the upper fin(s) cannot alone provide sufficient support to secure the elongate article. This aspect of the present invention is illustrated in FIG. 7. FIG. 7 shows three elongate articles of varying widths and weights.

The topmost illustration in FIG. 7 shows a narrow (not wide), comparatively "light" article—for example, a sheet of paper—where a single pair of fins provides sufficient support to secure the article.

The middle illustration in FIG. 7 shows a "moderately-wide" article of "moderate" weight—for example, the handle of a kitchen spatula—where two pairs of fins provide sufficient support to secure the article.

The bottom illustration in FIG. 7 shows a "wider" and comparatively "heavier" article—for example, the handle of a shovel—where three pairs of fins provide sufficient support to secure the article.

Figure 20:
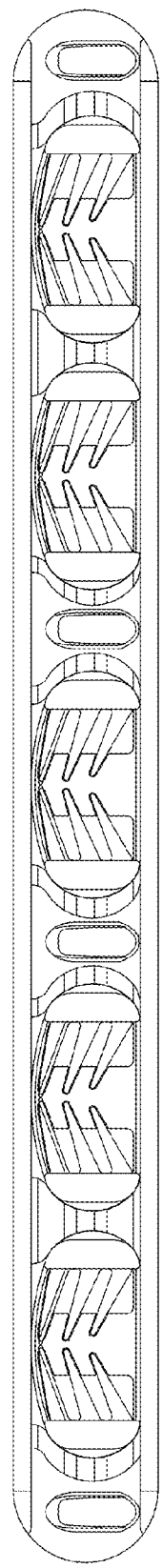
FIG. 20 shows five devices of the present invention oriented horizontally in a single row.
Figure 21:
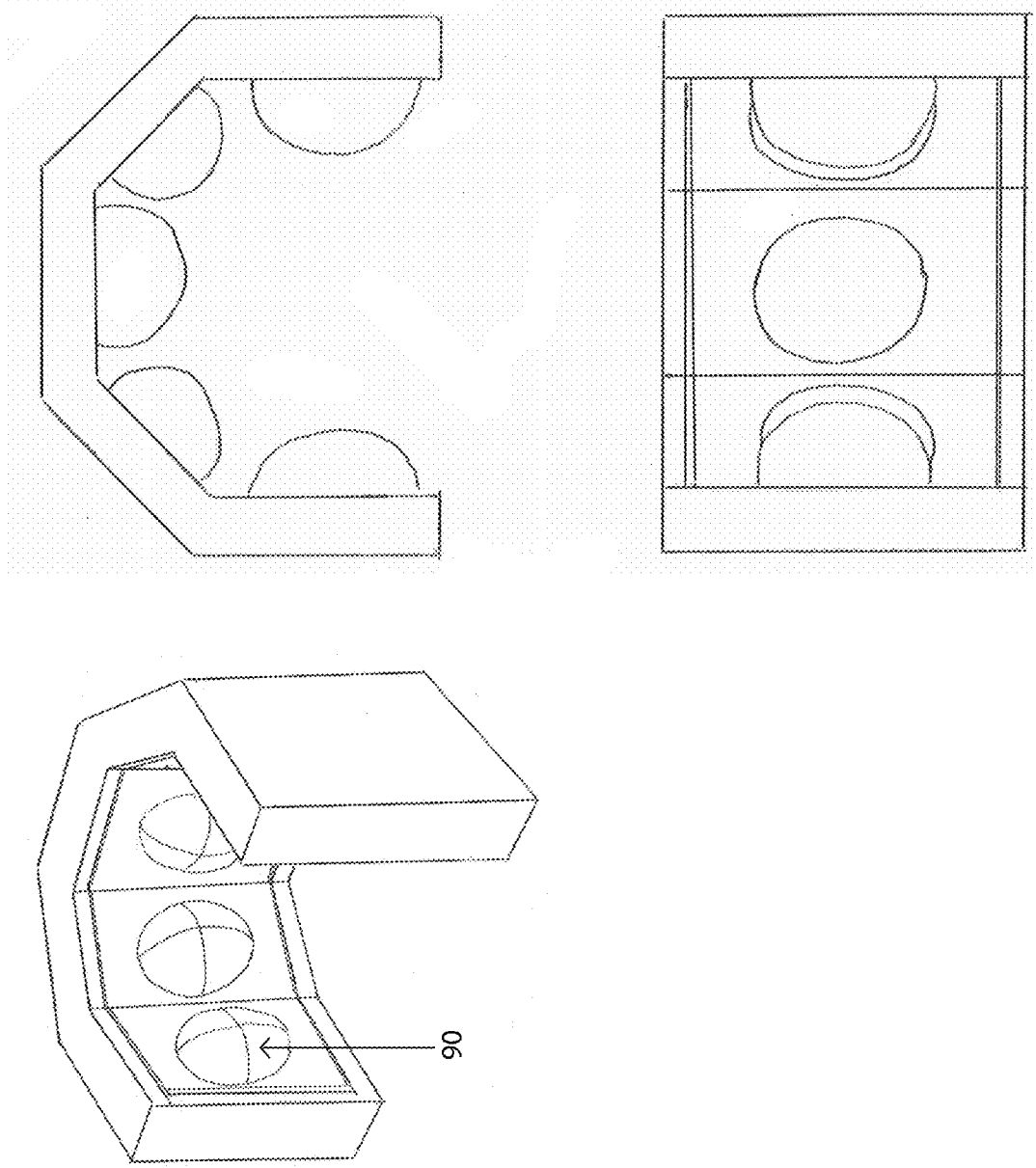
FIG. 21 illustrate an embodiment of the present invention in which the recess is configured with five straight walls, each having a nub.
Figure 22:
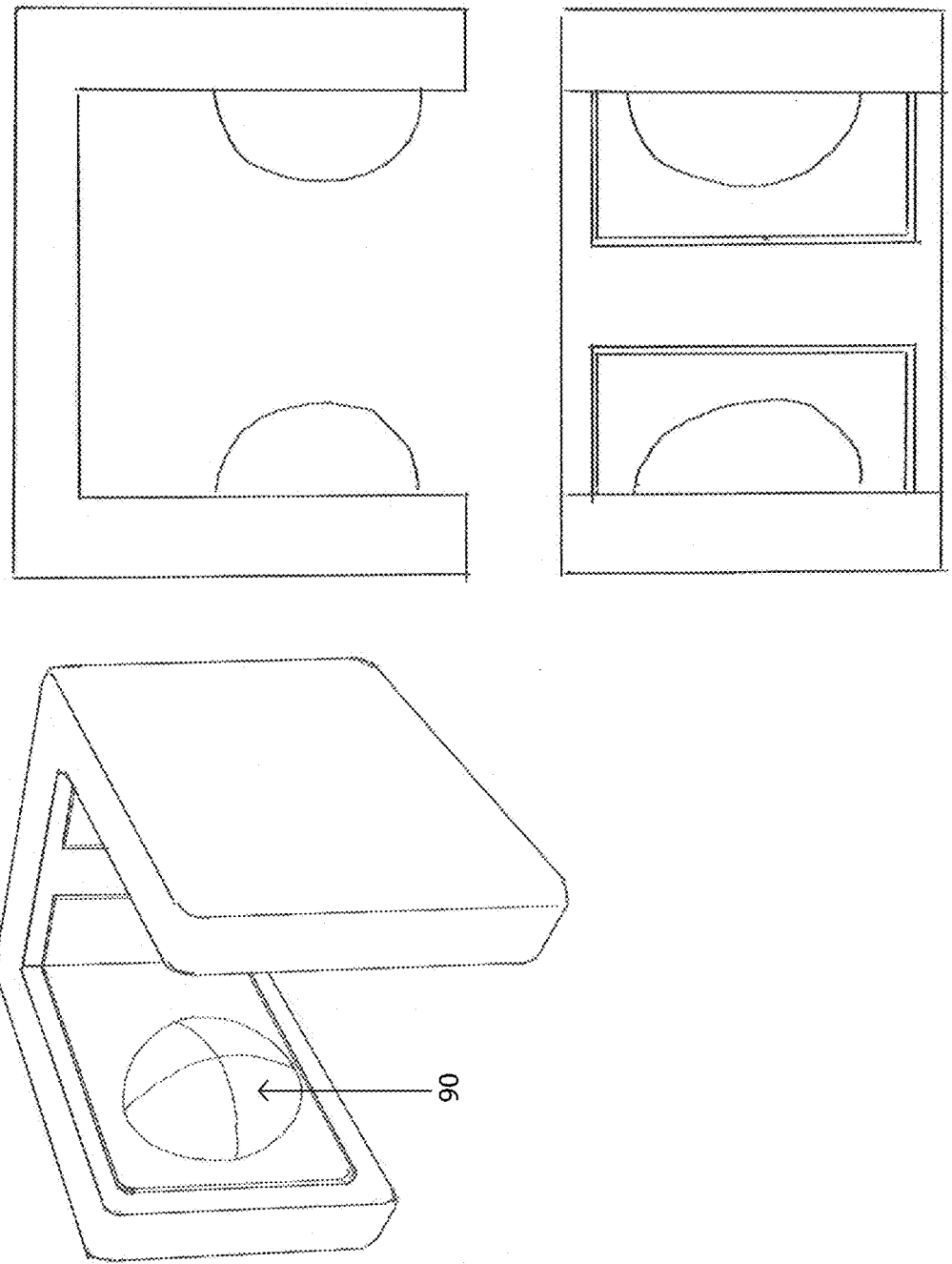
FIG. 22 illustrate an embodiment of the present invention in which the recess is configured with three straight walls, with a nub on each of two opposing walls.

In preferred embodiments of the present invention, a plurality of devices are oriented horizontally in a single row—using mounting rails slideably engaged with mounting channels of a mounting bracket—such that the elongate articles are held securely in a vertical position. This is illustrated, for example, in FIG. 20, which shows five holders of the present invention.

Figure 8:
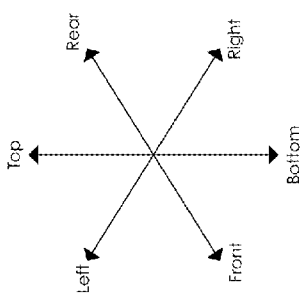
FIG. 8 illustrates two devices of the present invention positioned one on top of the other in a vertical orientation.
Figure 8:
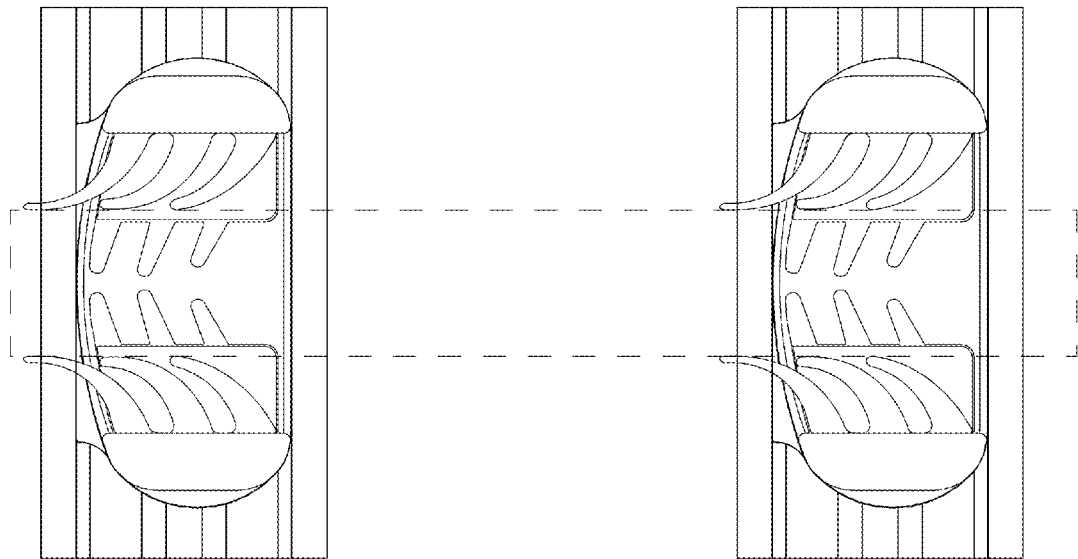

Two devices of the present invention can be positioned one on top of the other in a vertical orientation. This configuration provides additional support for "heavier" and/or "longer" articles and is illustrated in FIG. 8. One non-limiting example of a "heavier" and/or "longer" elongate article that can be secured with two devices of the present invention is a ski.

In preferred embodiments of the present invention, the device is mounted on a wall, and the elongate article(s) is/are pressed into and engaged by one or more pairs of finned holder elements, thereby holding the article in an upright position.

The skilled artisan will understand, however, that the device of the present invention can be rotated, for example, 90 degrees. Where the device of the present invention is rotated 90 degrees, the elongate article can be held securely in a horizontal position. Thus, with reference to FIG. 8, a ski can be held horizontally on a wall with two devices.

In certain preferred embodiments, the thickness of each finned holder element is tapered and decreases from its base portion in the direction of its free edge. The tapering of the finned holder elements is illustrated, for example, in topmost illustration of FIG. 6.

In other preferred embodiments, the receiving portion is rounded. The rounded receiving portion [13] is illustrated in FIGS. 3a and 3b.

In particularly preferred embodiments, the finned holder elements are both tapered and have a rounded receiving portion.

In especially preferred embodiments, the finned holder elements are tapered, and have both a rounded receiving portion [13] and a rounded recess [15].

Figure 14:
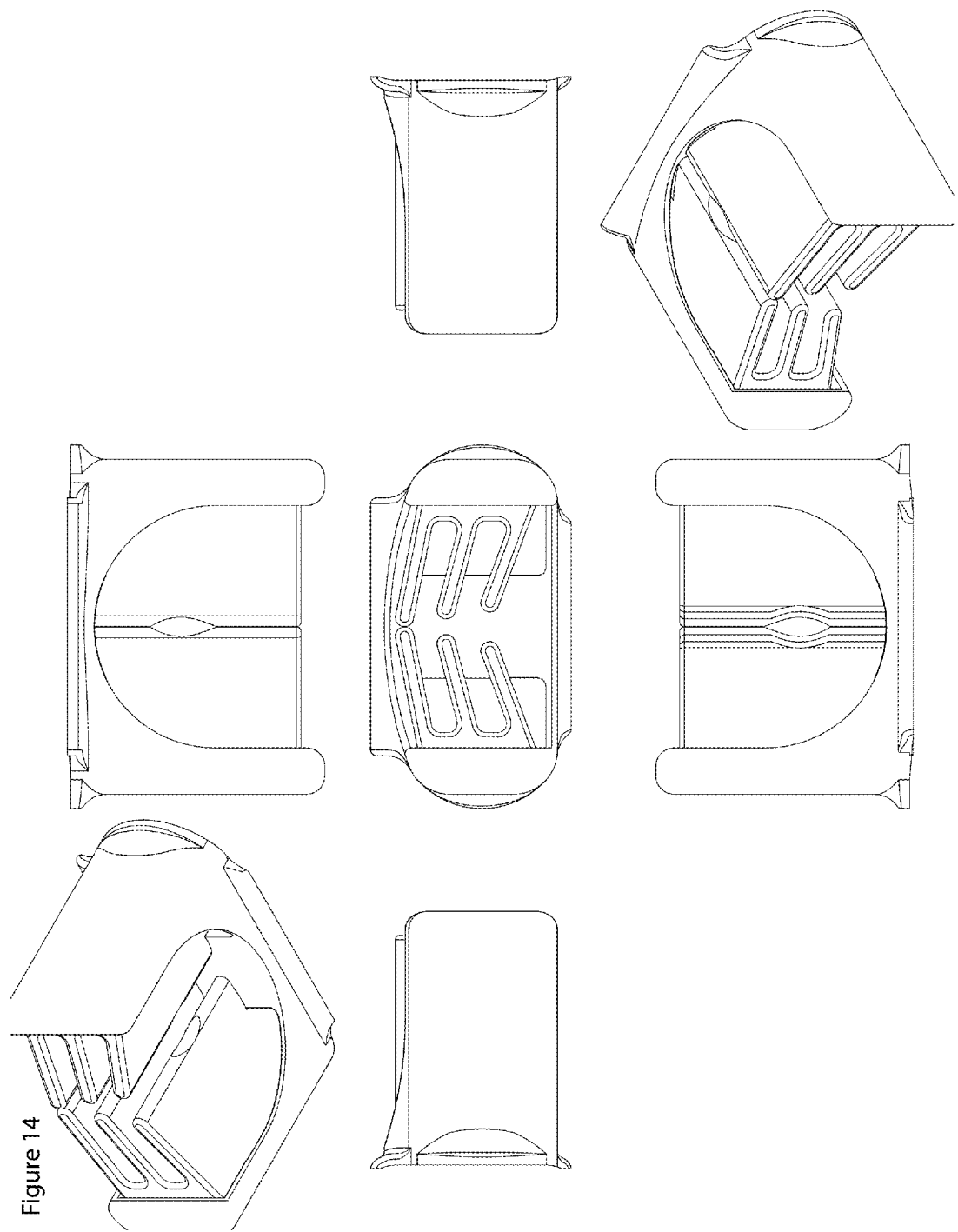
FIG. 14 illustrates an embodiment of the device of the present invention in which the fins are substantially of the same width and length, are not tapered and do not have rounded receiving portions.

Devices in which the fins are of substantially of the same width (e.g., the fins of the top pair are not wider than the fins of the bottom pair) and/or are not tapered and/or do not have rounded receiving portions are also to be understood as within the scope of the present invention. This embodiment is illustrated in FIG. 14, showing finned holder elements of the same length with non-rounded receiving portions.

The devices of the present invention are preferably affixed to a surface, preferably a wall, on a mounting bracket, whereby the mounting rails on the device slideably engage the mounting channels on the mounting bracket.

Figure 11:
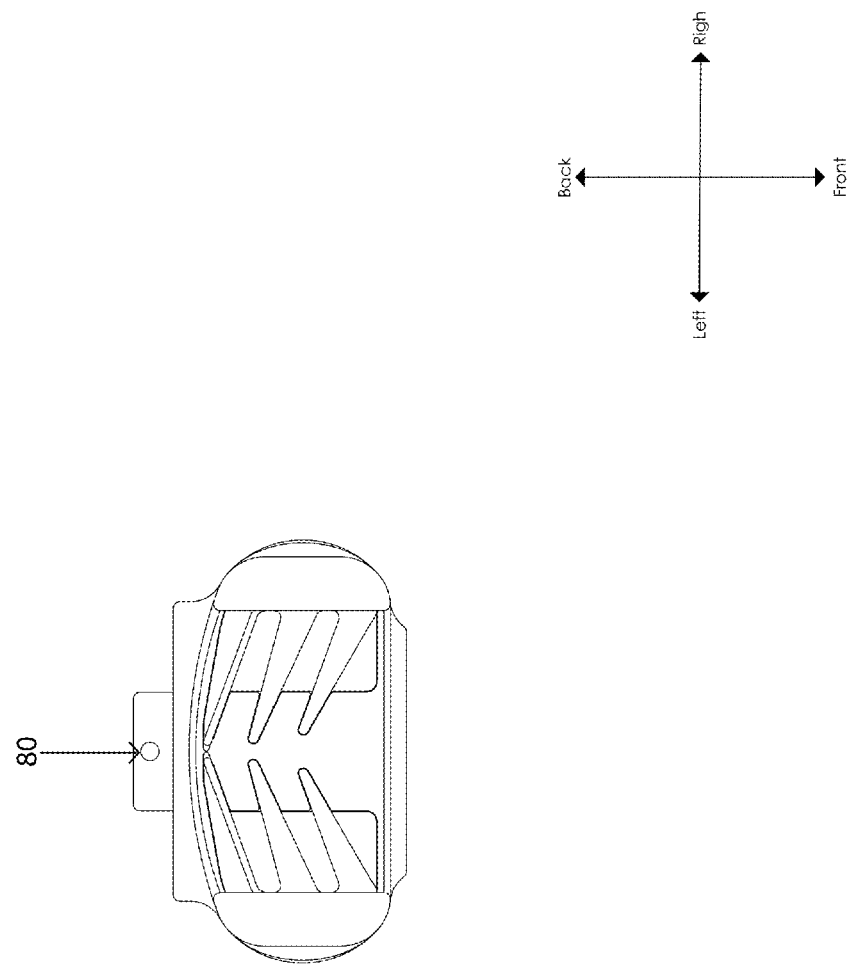
FIG. 11 shows a device of the present invention having a hole for affixing the device to a wall.

The devices of the present invention can also be affixed to a surface, preferably a wall, by different means. By way of non-limiting example, a device within the scope of the present invention can have at least one hole [80] for affixing the device to a wall with a screw, a nail, an anchor or a bolt. This embodiment is illustrated in FIG. 11.

Alternatively, a device within the scope of the present invention can be affixed to a surface, preferably a wall, with an adhesive such as double-sided strips, glue, or a magnet. By way of non-limiting example, a device with a magnetic backing could be affixed directly to a metal refrigerator door or the side of metal cabinet. In the case of a magnet, a metal plate could be screwed onto a wall, allowing the magnetized backing on the device to magnetically attach to the metal plate.

Figure 5A:
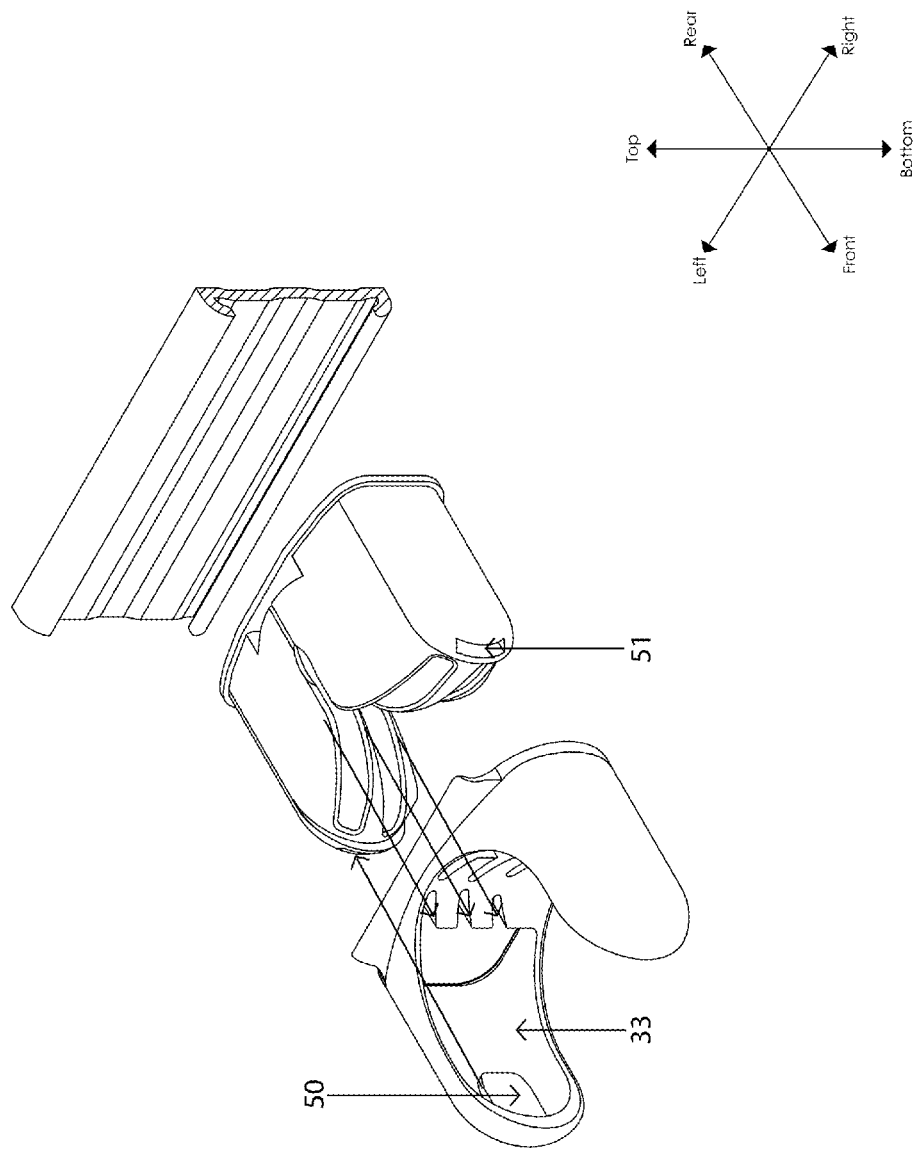
FIGS. 5a and 5b illustrate embodiments of the device of the present invention in which a slit is configured and dimensioned to snugly receive a corresponding tab member.
Figure 5B:
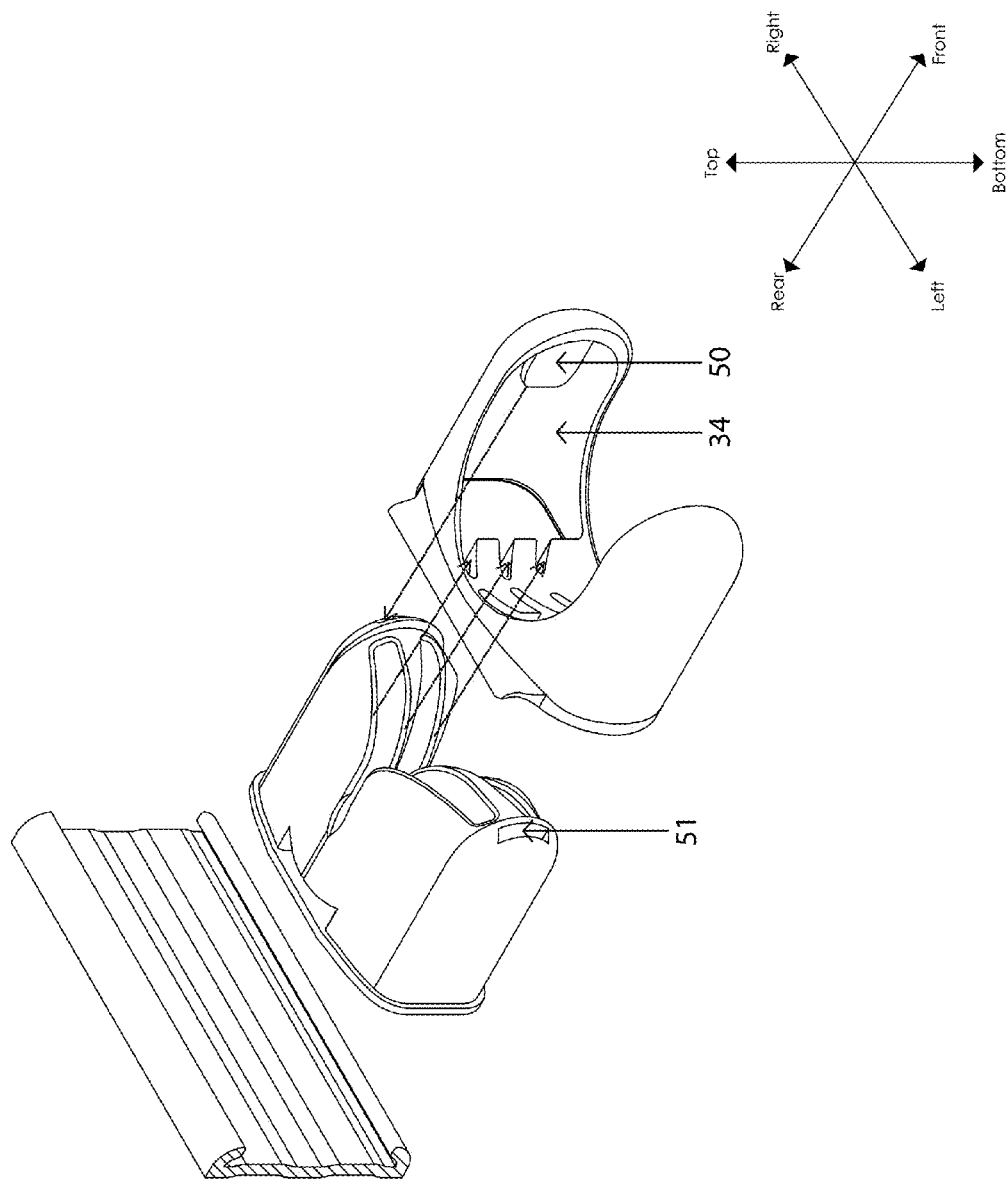

FIGS. 5a and 5b illustrate still other preferred embodiments in which the device of the present invention has a tab member [50] located on a front surface of each cavity of the housing member. Each tab member extends in the direction of the rear portion of the housing member. In these embodiments there is a slit [51] on a front surface of the side portion of each of the unitary left half and the unitary right half. The slit is configured and dimensioned to snugly receive a corresponding tab member on the housing member.

Figure 10:
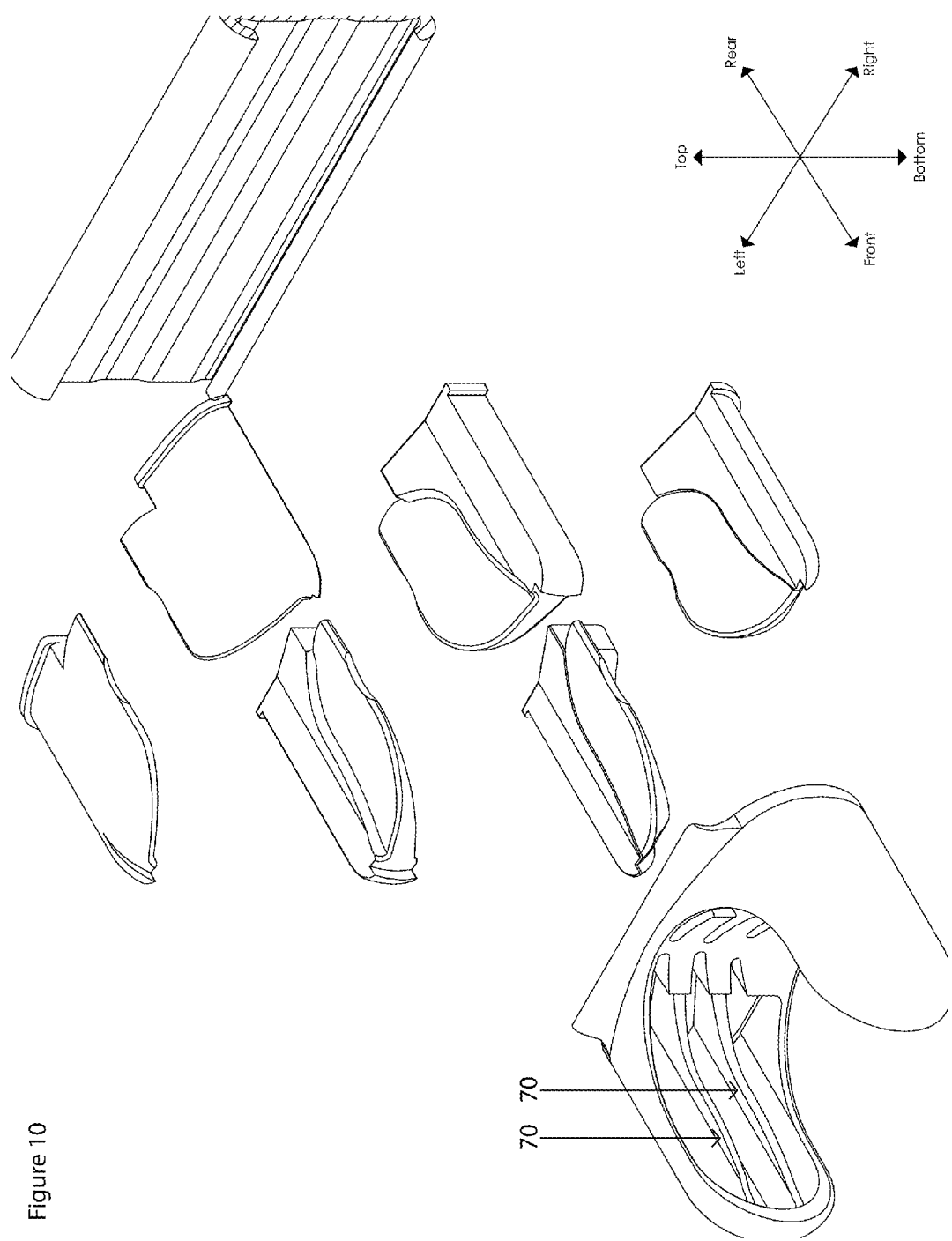
FIG. 10 illustrates an embodiment of the device of the present invention having two cavities for receiving six separate fins, with guiderails dividing each of the cavities into top, middle and bottom sections.

In certain embodiments of the present invention, the finned holder elements are not fabricated as a unitary piece, but instead are separate. In these embodiments, each cavity contains at least one horizontal guiderail [70]. FIG. 10 illustrates this embodiment with references to a device having six fins. Each of the cavities contains two guiderails, dividing each cavity into a top section, a middle section and a bottom section. The top section is configured and dimensioned to receive the side portion of the top finned holder element in each top pair. The middle section is configured and dimensioned to receive the side portion of the middle finned holder element in each middle pair. The bottom section is configured and dimensioned to receive the bottom portion of the bottom finned holder element in each bottom pair.

In another aspect of this embodiment, the device has four fins. The left and right cavities each contain a single guiderail, dividing the cavity into a top section and a bottom section, the top section configured and dimensioned to receive the side portion of the top finned holder element, the bottom section configured and dimensioned to receive the side portion of the bottom finned holder element.

Figure 9B:
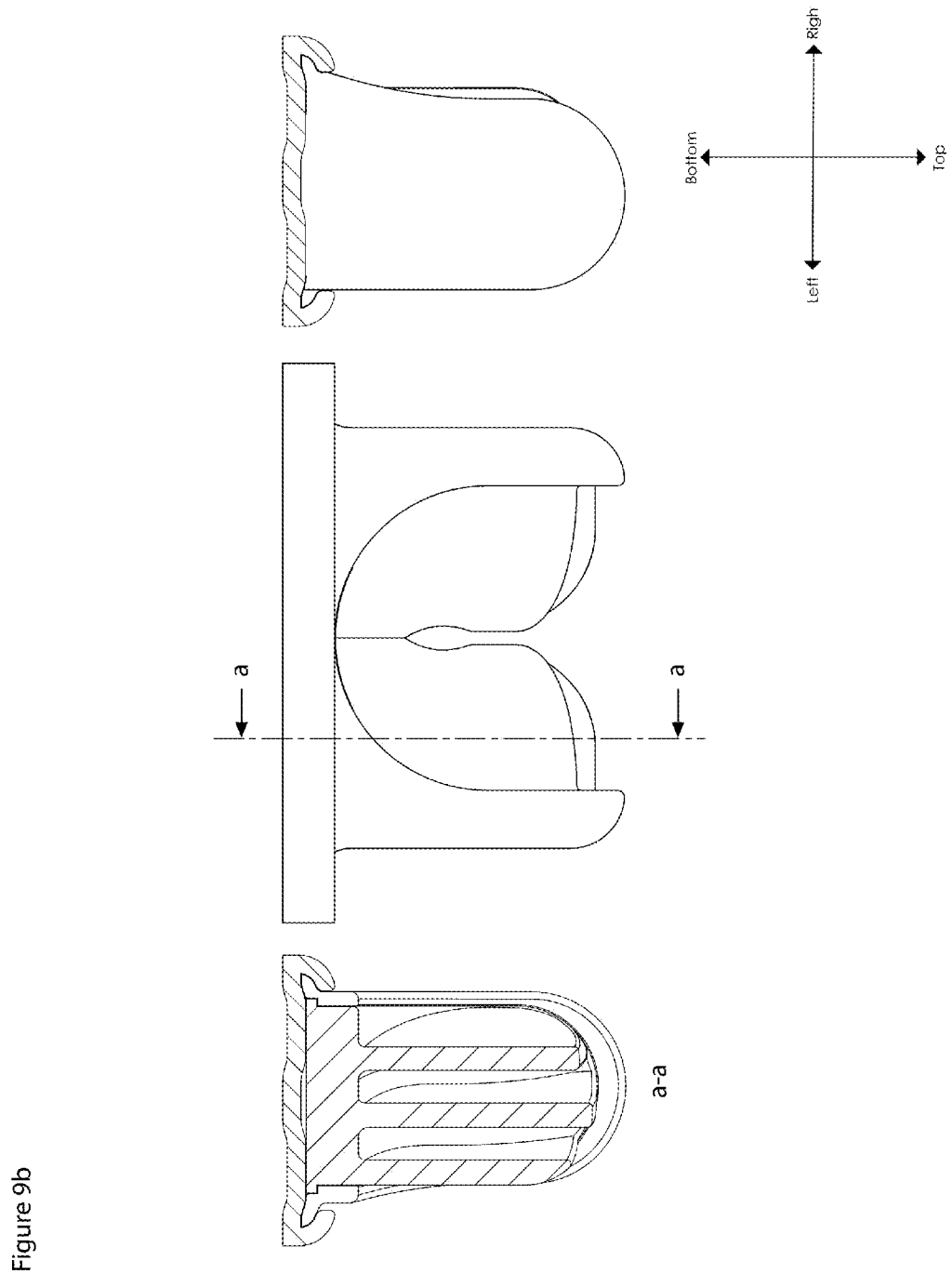
FIG. 9b shows the back portion of the finned holder protruding in a rearward direction beyond the housing member and forming a friction contact area with a mounting bracket.

The back portion of each finned holder protrudes in a rearward direction beyond the housing member and forms a friction contact area with a mounting bracket. This is illustrated in FIG. 9b.

In certain embodiments, the finned holders elements are not oriented in pairs, but instead in a staggered, alternating, top-to-bottom configuration.

Figure 12:
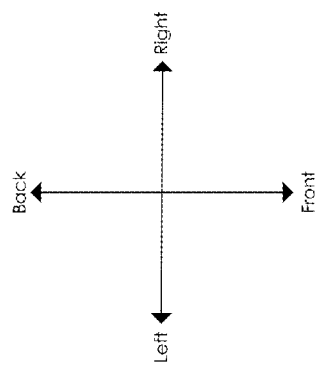
FIG. 12 shows an embodiment of the device of the present invention having three finned holder elements on the left side of the device, and two finned holder elements on the right side of the device.
Figure 12:
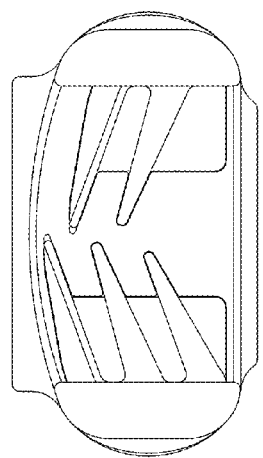

FIG. 12 shows three finned holder elements on the left side of the device of the present invention, and two finned holder elements on the left side of the device of the present invention. The fins are staggered such that their respective free edges are at different levels (heights) and engage the elongate article at different positions.

Figure 13:
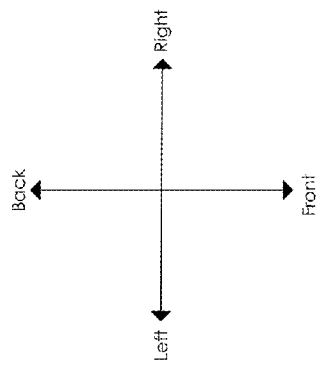
FIG. 13 shows an embodiment of the device of the present invention having four finned holder elements on the left side of the device, and three finned holder elements on the right side.
Figure 13:
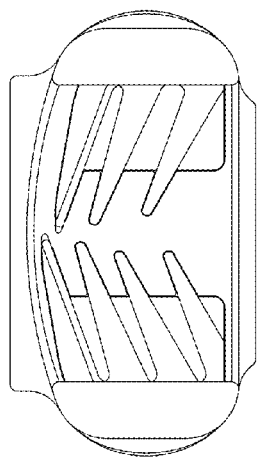

FIG. 13 shows four finned holder elements on the left side of the device of the present invention, and three finned holder elements on the right side.

Figure 15A:
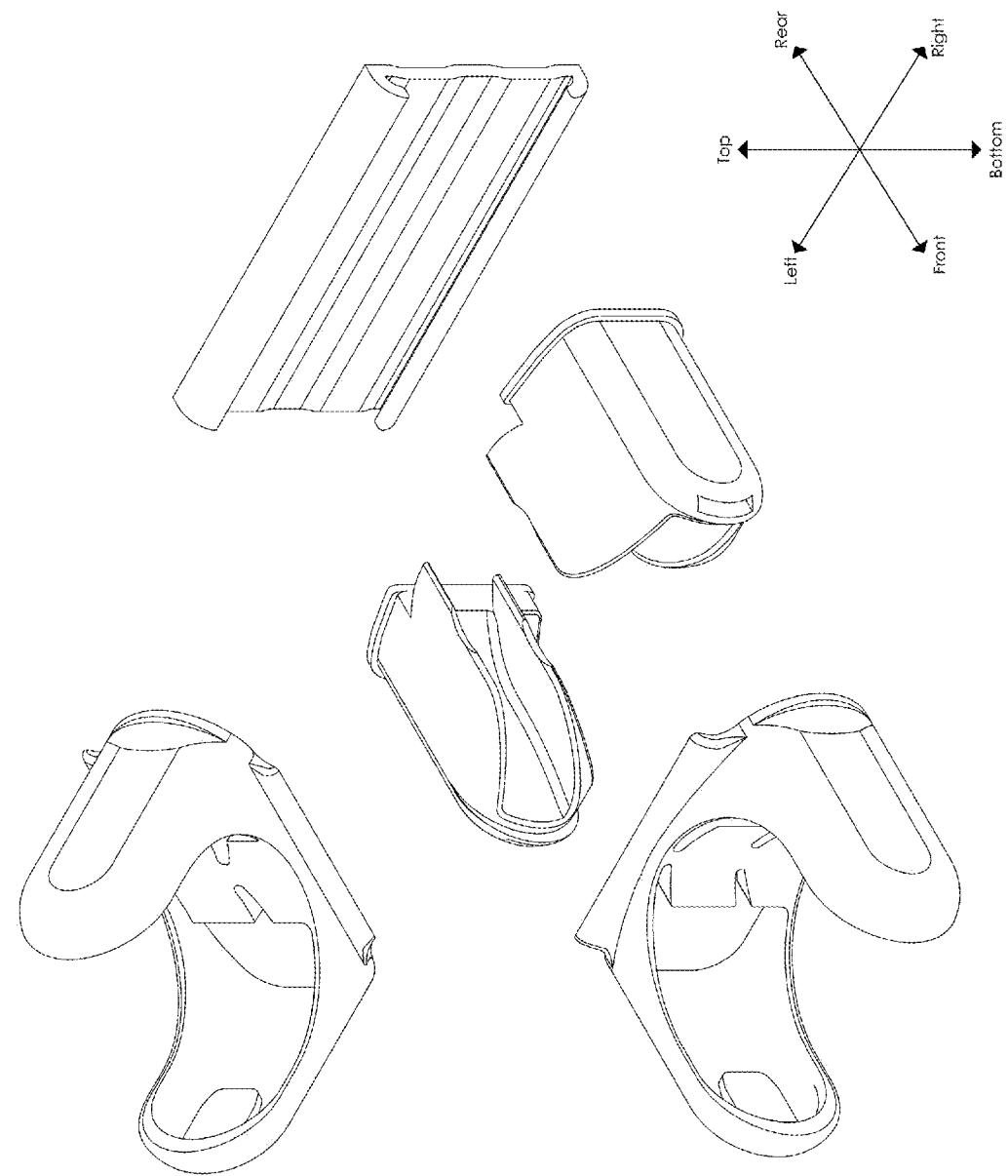
FIG. 15a shows an exploded view of an embodiment of the present invention in which the two pairs of finned holder elements are fabricated as two unitary halves—left and right.

Other embodiments having a staggered, alternating, top-to-bottom configuration are to be understood within the scope of the invention:
  (i) left—one finned holder; right—two finned holders;
  (ii) left—two finned holders; right—one finned holder;
  (iii) left—two finned holders; right—two finned holders;
  (iv) left—three finned holders; right—two finned holders;
  (v) left—two finned holders; right—three finned holders;
  (vi) left—three finned holders; right—three finned holders;
  (vii) left—four finned holders; right—two finned holders;
  (viii) left—two finned holders; right—four finned holders;
  (ix) left—four finned holders; right—three finned holders;
  (x) left—three finned holders; right—four finned holders;
  (xi) left—four finned holders; right—four finned holders FIG. 15a shows an exploded view of an embodiment of the present invention in which the two pairs of finned holder elements are fabricated as two unitary halves—left and right.

Figure 15B:
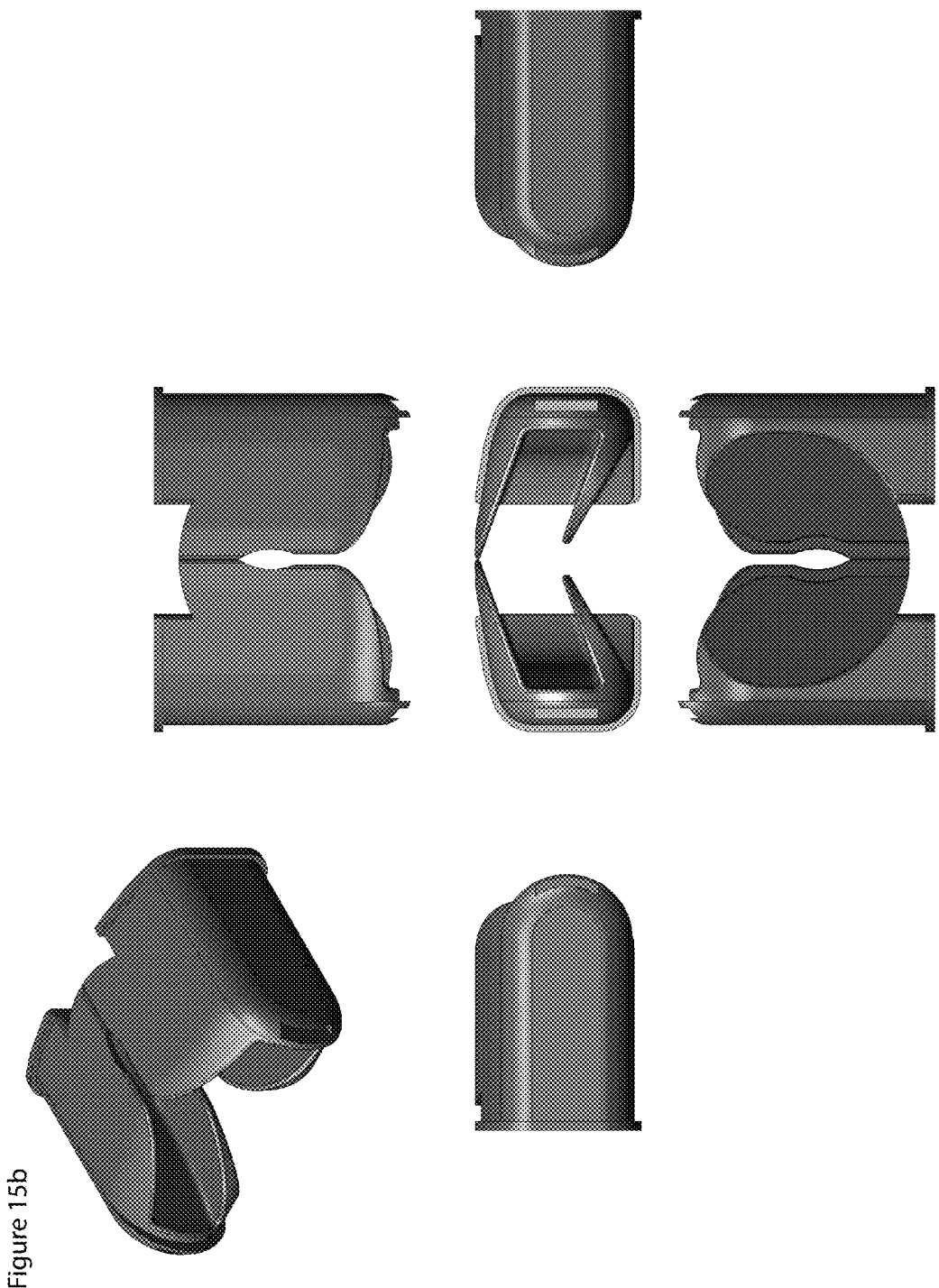
FIG. 15b shows six views of an embodiment of the present invention in which the two pairs of finned holder elements are fabricated as a unitary left half and a unitary right half—top, front, bottom, left, right and perspective.

FIG. 15b shows six views of an embodiment of the present invention in which the two pairs of finned holder elements are fabricated as a unitary left half and a unitary right half—top, front, bottom, left, right and perspective.

Figure 16A:
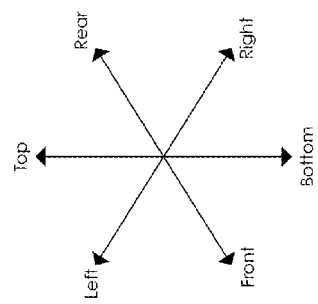
FIG. 16a shows an embodiment of the present invention in which the two pairs of finned holder elements are fabricated as single unitary elastomeric insert.
Figure 16A:
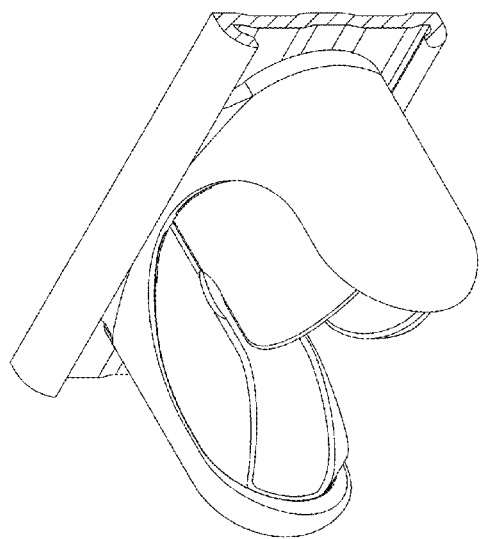
Figure 16B:
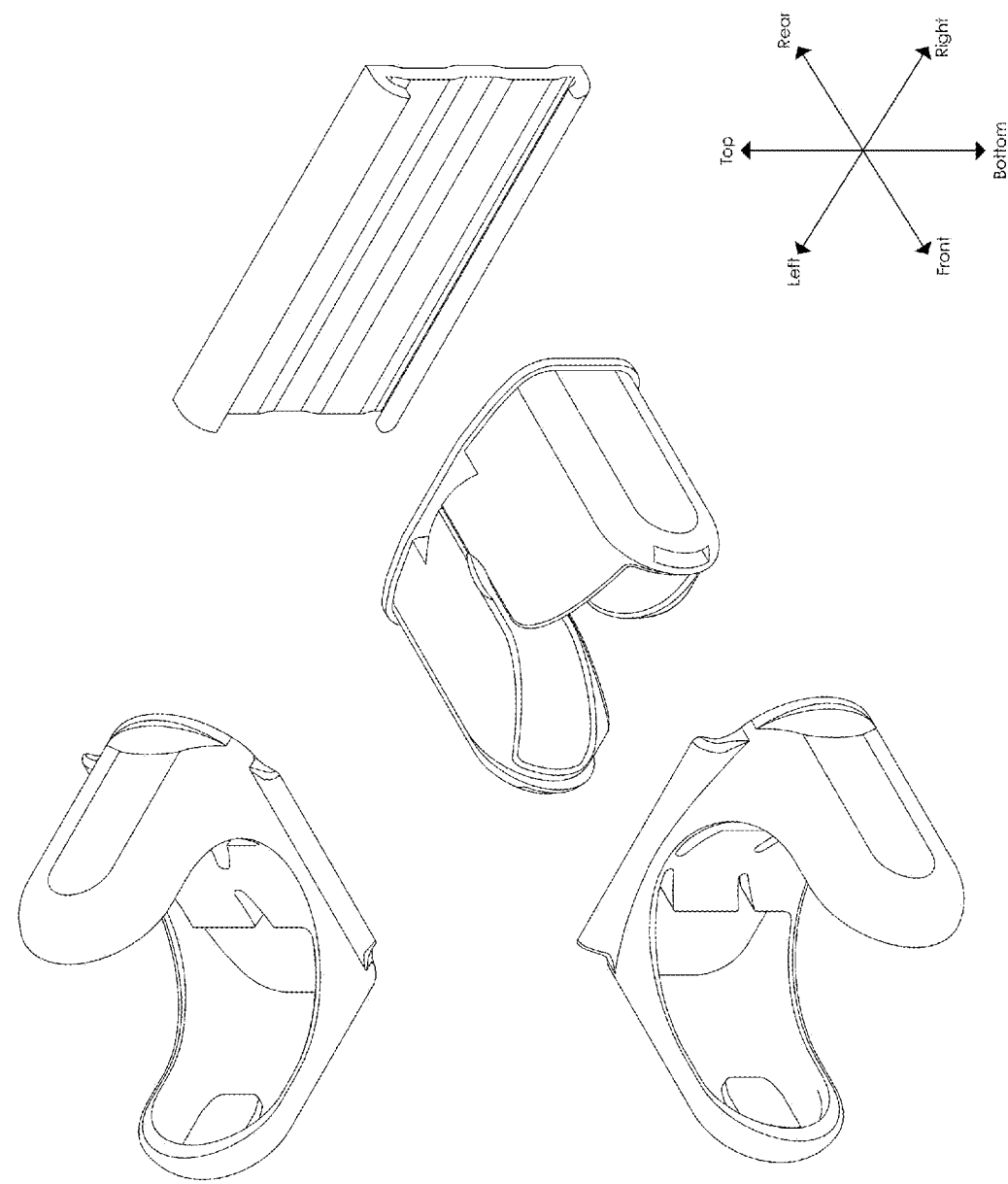

FIGS. 16a and 16b both illustrate an embodiment of the present invention in which the two pairs of finned holder elements are fabricated as single unitary elastomeric insert.

Figure 16C:
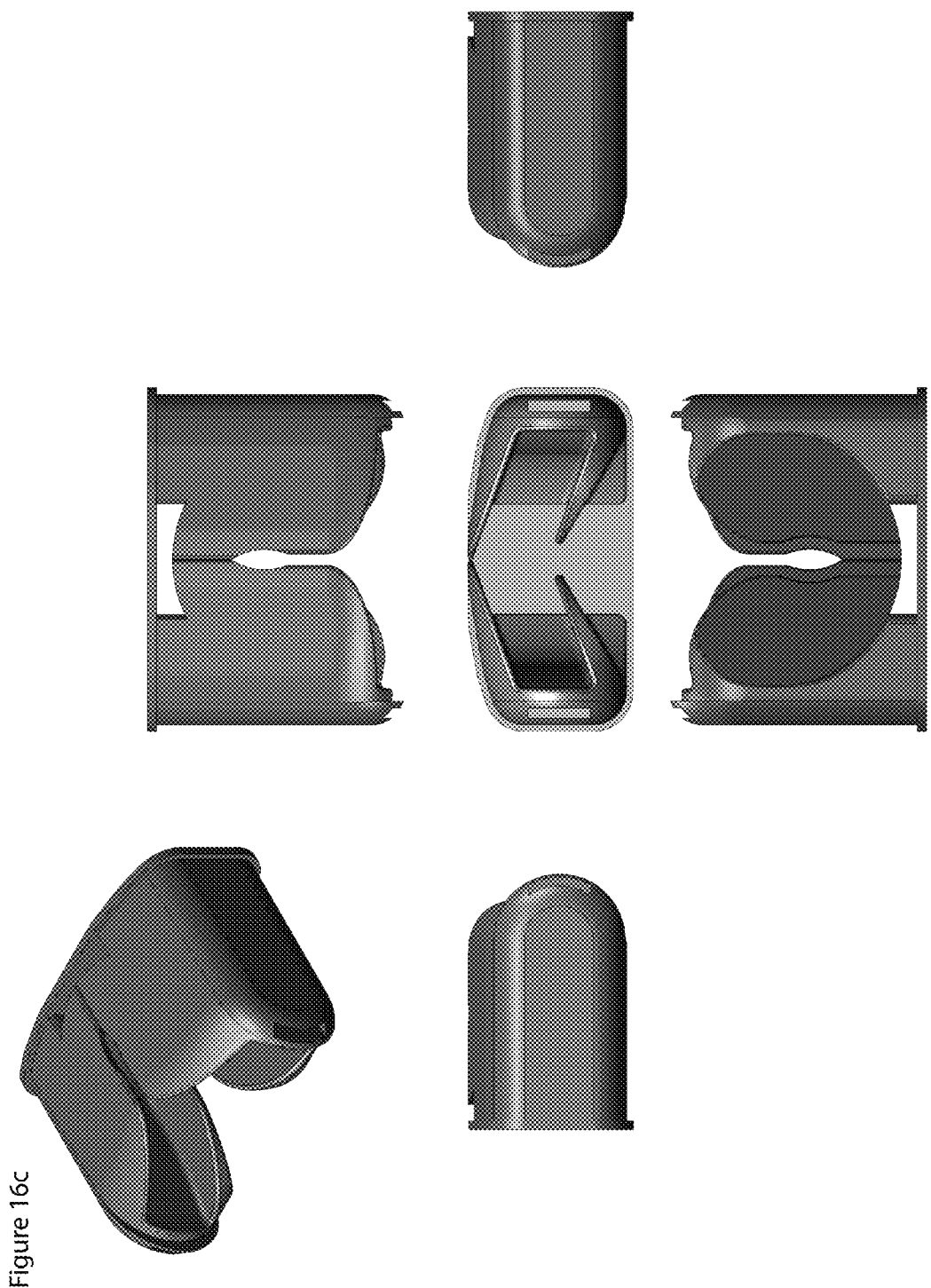
FIG. 16c shows six views of the embodiment of FIG. 16a—top, front, bottom, left, right and perspective.

FIG. 16a shows this embodiment fully assembled—i.e., housing (with finned holder elements inserted) attached to a mounting bracket by slideable engagement of the mounting rails on the housing with the mounting channels on the bracket. FIG. 16b is an exploded view of this embodiment. FIG. 16c shows six views of the same embodiment—top, front, bottom, left, right and perspective.

Figure 17A:
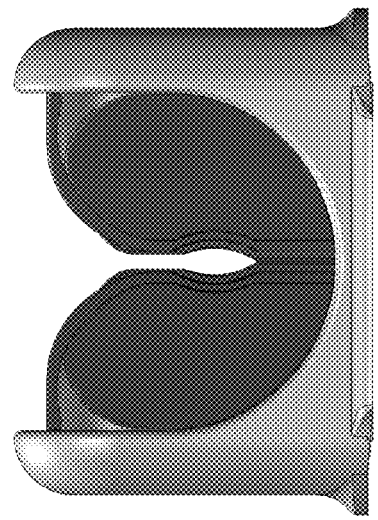
FIG. 17a shows perspective and bottom views of an embodiment of the present invention in which the three pairs of finned holder elements are fabricated as two unitary halves—left and right.
Figure 17A:
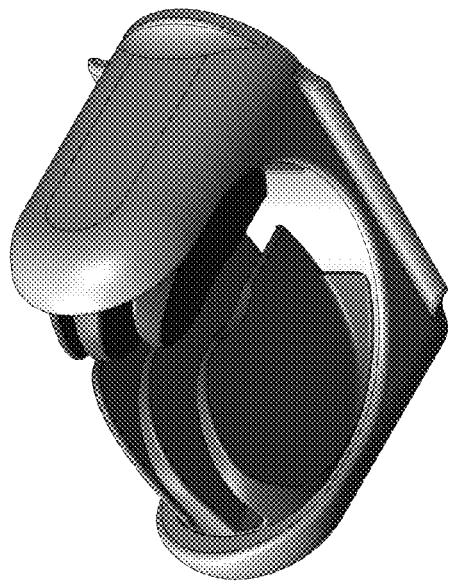
Figure 17B:

FIG. 17a shows perspective and bottom views of an embodiment of the present invention in which the three pairs of finned holder elements are fabricated as two unitary halves—left and right. FIG. 17b is an exploded view of FIG. 17a.

Figure 18:
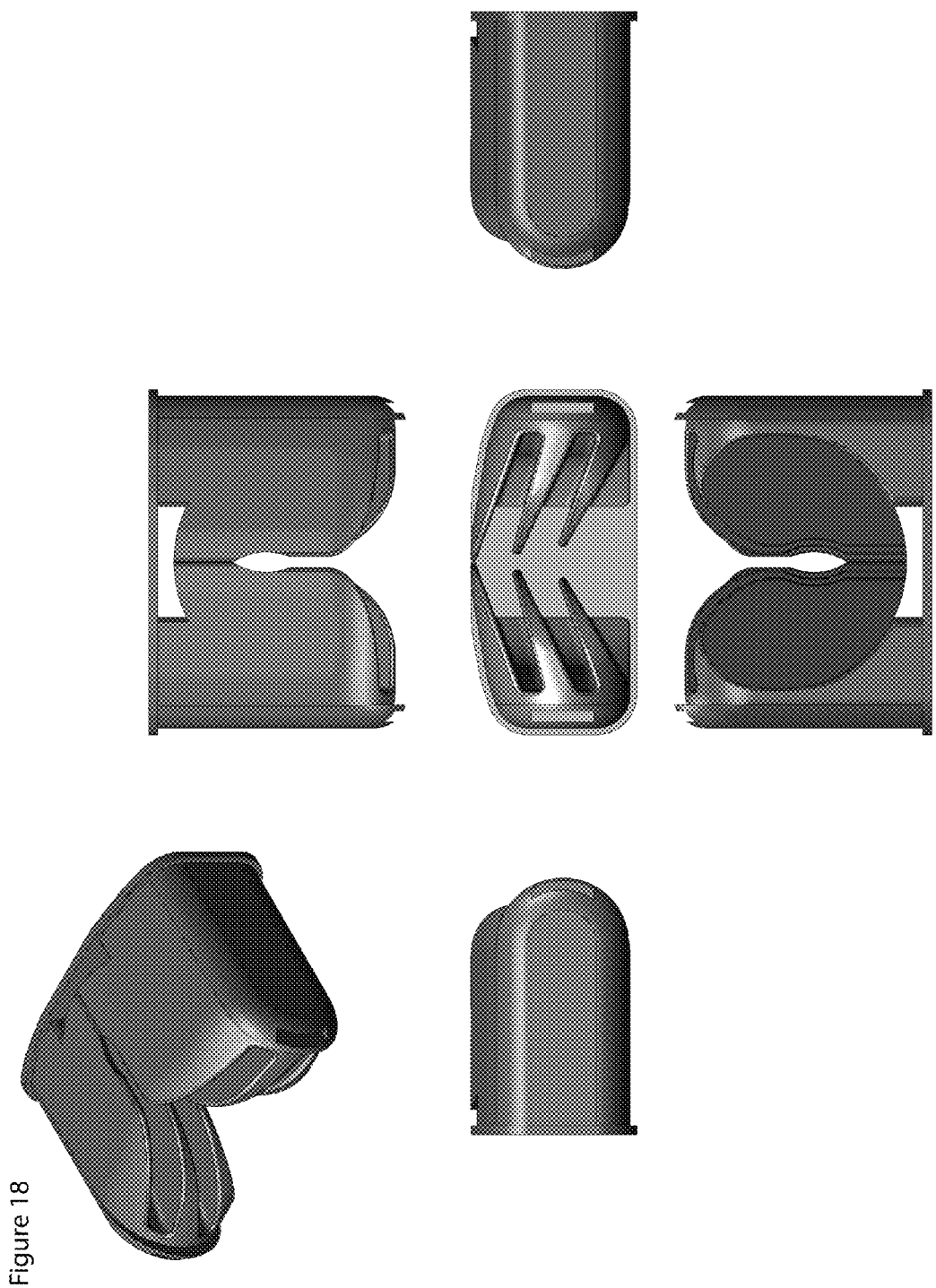
FIG. 18 illustrates an embodiment of the present invention in which the three pairs of finned holder elements are fabricated as single unitary elastomeric insert; top, front, bottom, left, right and perspective views are shown.

FIG. 18 illustrates an embodiment of the present invention in which the three pairs of finned holder elements are fabricated as single unitary elastomeric insert. Top, front, bottom, left, right and perspective views are shown.

Figure 19:
FIG. 19 shows an exploded view of eight separate tapered finned holder elements in a housing in which each cavity has three guiderails; each of the finned holder elements is held in place both by the centrally-slotted member and guiderails.

FIG. 19 shows an exploded view of eight separate tapered finned holder elements in a housing in which each cavity has three guiderails. Each of the finned holder elements is held in place both by the centrally-slotted member and guiderails.

In all of the embodiments of the present invention, the finned holder elements—whether fabricated individually, as unitary left and right halves, or as a single unitary elastomeric insert—are inserted from rear to front and snuggly fit in the housing.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth hereinabove but rather that the claims be construed as encompassing all the features of patentable novelty which reside in the present invention, including all features which would be treated as equivalents thereof by those skilled in the art to which the invention pertains.

The invention claimed is:

1. A device for securing an elongate article comprising:
   (a) at least four finned holder elements,
      each finned holder element being fabricated of an elastomeric material,
      the at least four finned holder elements being oriented in at least two pairs, a top pair and a bottom pair
      each pair having a left finned holder element and a right finned holder element, the left and right finned holder elements being mirror images of each other,
      each finned holder element being upwardly disposed at an angle of about 1° to 60° relative to a horizontal plane, and having
         (i) a side portion [16] contiguous with an upper portion [18], a base portion [17], and a back portion [19] and
         (ii) a free edge [12] having a
            (a) a receiving portion [13] and
            (b) a linear securing portion [14] having a recess [15],
   (b) a housing member [30] having left and right cavities [33 and 34] housing the left and right finned holder elements in opposing juxtaposition, the housing member having a rear portion [40] having a vertical support [47], separating a left through-hole [41] and a right through-hole [43].

2. The device according to claim 1, wherein the vertical support is a centrally-slotted member, and the left and right through-holes are symmetrically disposed on either side of the centrally-slotted member, thereby forming a left side and a right side, the left side of the centrally-located slotted member having at least two slots, a top-left slot, and a bottom-left slot, the right side of the centrally-located slotted member having two slots, a top-right slot, and a bottom-right slot, the top-left and top-right slots configured and dimensioned to receive the free edges of each finned holder element of the top pair, and the bottom-left and bottom-right slots configured and dimensioned to receive the free edges of each finned holder element of the bottom pair.

3. The device according to claim 1 wherein each finned holder element has a width measured from its side portion to the linear securing portion of its free edge, and further wherein the width of each of the two finned holder elements in the top pair is greater than the width of each of the two finned holder elements in the bottom pair.

4. The device according to claim 1 having a unitary left half and a unitary right half wherein
   (a) the unitary left half is comprised of at least two finned holder elements, (i) a left finned holder element of the top pair and (ii) a left finned holder element of the bottom pair, and
   (b) the unitary right half is comprised of at least two finned holder elements, (i) a right finned holder element of the top pair, and (ii) a right finned holder element of the bottom pair
and further wherein the free edges of each finned holder element of the unitary left half are received by two slots left of the centrally-located slotted member, and the free edges of each finned holder element of the unitary right half are received by two slots right of the centrally-located slotted member.

5. The device according to claim 1 wherein each finned holder element has a thickness that is tapered and decreases from its base portion towards its free edge.

6. The device according to claim 1 wherein each receiving portion is rounded.

7. The device according to claim 1 wherein each recess is rounded.

8. The device according to claim 1 further comprising:
   (a) a tab member [50] located on a front surface of each of cavity of the housing member, each tab member extending towards the rear portion of the housing member, and
   (b) a slit [51] on a front surface of a side portion of each of a unitary left half and a unitary right half, the slit configured and dimensioned to snugly receive a corresponding tab member on the housing member.

9. The device according to claim 1 wherein each finned holder element has a Shore A hardness of about 35 to about 70.

10. The device according to claim 1 wherein each finned holder element has a Shore A hardness of about 50 to about 55.

11. The device according to claim 1 wherein each finned holder element is upwardly disposed at an angle of about 5° to about 45° relative to a horizontal plane.

12. The device according to claim 1 wherein each finned holder element is upwardly disposed at an angle of about 10° to about 30° relative to a horizontal plane.

13. The device according to claim 1 wherein each finned holder element is upwardly disposed at an angle of about 15° to about 25° relative to a horizontal plane.

14. The device according to claim 1 comprising top and bottom mounting rails [31 and 32] and further comprising a mounting bracket [40] having a top channel [41] and a bottom channel [42] in slideable engagement with top and bottom mounting rails [31 and 32] of the housing member.

15. The device according to claim 14 wherein the back portion of each finned holder protrudes in a rearward direction beyond the housing member and forms a friction contact area with a mounting bracket [40].

16. A device for securing an elongate article comprising:
(a) six finned holder elements [10a, 10b, 10c, 11a, 11b, 11c], each finned holder element being fabricated of an elastomeric material,
the six finned holder elements being oriented in three pairs, a top pair, a middle pair, and a bottom pair, each pair having a left finned holder element and a right finned holder element, the left and right finned holder elements being mirror images of each other,
each finned holder element being upwardly disposed at an angle of about 1° to 60° relative to a horizontal plane, and having
(i) a side portion [16] contiguous with an upper portion [18], a base portion [17], and a back portion [19] and
(ii) a free edge [12] having a
(a) a receiving portion [13] and
(b) a linear securing portion [14] having a recess [15],
(b) a housing member [30] having left and right cavities [33 and 34] housing the left and right finned holder elements in opposing juxtaposition, the housing member having a rear portion [40] having a vertical support [47], separating a left through-hole [41] and a right through-hole [43].

17. The device according to claim 16, wherein the vertical support is a centrally-slotted member, and the left and right through-holes are symmetrically disposed having a centrally-located slotted member [45] separating a left through-hole [41] and a right through-hole [43], the left and right through-holes being symmetrically disposed on either side of the centrally-slotted member, thereby forming a left side and a right side, the left side of the centrally-located slotted member having three slots, a top-left slot [42a], a middle-left slot [42b] and a bottom-left slot [42c], the right side of the centrally-located slotted member having three slots, a top-right slot [44a], a middle-right slot [44b], and a bottom-right slot [44c], the top-left and top-right slots configured and dimensioned to receive the free edges of each finned holder element of the top pair, and the middle-left and middle-right slots configured and dimensioned to receive the free edges of each finned holder element of the middle pair, and the bottom-left and bottom-right slots configured and dimensioned to receive the free edges of each finned holder element of the bottom pair.

18. The device according to claim 16, wherein each finned holder element has a width measured from its side portion to the linear securing portion of its free edge, and further wherein the width of each of the two finned holder elements in the top pair is greater than the width of each of the two finned holder elements in the middle pair, and the width of each of the two finned holder elements in the middle pair is greater than the width of each of the two finned holder elements in the bottom pair.

19. The device according to claim 16 wherein the device has a centrally-slotted member, with a left side and a right side, and the device is further comprised of
(a) a unitary left half is comprised of the left finned holder element of the top pair, the left finned element of the middle pair, and the left finned holder element of the bottom, and
(b) a unitary right half is comprised of the right finned holder element of the top pair, the right finned element of the middle pair, and the right finned holder element of the bottom pair,
and further wherein the free edges of each finned holder element of the unitary left half [10a, 10b and 10c] are received by three slots on the left side of the centrally-located slotted member [42a, 42b and 42c] and the free edges of each finned holder element of the unitary right half [11a, 11b and 11c] are received by three slots on the right side of the centrally-located slotted member [44a, 44b and 44c].

* * * * *